(12) United States Patent
Nie

(10) Patent No.: US 11,698,466 B2
(45) Date of Patent: Jul. 11, 2023

(54) POSITIONED LOCATION ADJUSTMENT METHOD AND APPARATUS

(71) Applicant: HUAWEI CLOUD COMPUTING TECHNOLOGIES CO., LTD., Gui'an New District (CN)

(72) Inventor: Yongfeng Nie, Xi'an (CN)

(73) Assignee: HUAWEI CLOUD COMPUTING TECHNOLOGIES CO., LTD., Gui'an New District (CN)

( * ) Notice: Subject to any disclaimer, the term of this patent is extended or adjusted under 35 U.S.C. 154(b) by 227 days.

(21) Appl. No.: 17/321,782

(22) Filed: May 17, 2021

(65) Prior Publication Data
US 2021/0270977 A1 Sep. 2, 2021

Related U.S. Application Data

(63) Continuation of application No. PCT/CN2019/103928, filed on Sep. 2, 2019.

(30) Foreign Application Priority Data

Nov. 20, 2018 (CN) .......................... 201811386522.4

(51) Int. Cl.
  *G01S 19/48* (2010.01)
  *G06T 7/73* (2017.01)
  (Continued)

(52) U.S. Cl.
  CPC .......... *G01S 19/485* (2020.05); *G01S 19/428* (2013.01); *G01S 19/51* (2013.01); *G06T 7/73* (2017.01);
  (Continued)

(58) Field of Classification Search
  CPC .. G08G 5/0026; G08G 5/0052; G08G 1/0112; G08G 1/161; G08G 1/164;
  (Continued)

(56) References Cited

U.S. PATENT DOCUMENTS 10,814,872 B2 * 10/2020 Sofra .................. G05D 1/0212
2004/0230374 A1    11/2004 Tzamaloukas
(Continued)

FOREIGN PATENT DOCUMENTS

CN       103292804 A    9/2013
CN       103454660 A   12/2013
(Continued)

*Primary Examiner* — Dung Hong
(74) *Attorney, Agent, or Firm* — Maier & Maier, PLLC

(57) ABSTRACT

A positioned location adjustment method and apparatus. The method includes: a first vehicle sends a request message to a plurality of reference vehicles, where the request message includes current location information of the first vehicle; the first vehicle receives a response message from the reference vehicle, where the response message includes positioned location information of the reference vehicle, a positioning error value of the reference vehicle, and vehicle identifier information of the reference vehicle; the first vehicle determines a second vehicle from the plurality of reference vehicles based on the positioning error value of the reference vehicle; and the first vehicle adjusts the first positioned location information based on positioned location information of the second vehicle and vehicle identifier information of the second vehicle, to obtain second positioned location information. According to the embodiments, positioning precision and accuracy can be improved.

20 Claims, 11 Drawing Sheets

(51) Int. Cl.
 *H04W 4/40* (2018.01)
 *G01S 19/42* (2010.01)
 *G01S 19/51* (2010.01)

(52) U.S. Cl.
 CPC ..... *H04W 4/40* (2018.02); *G06T 2207/30252* (2013.01)

(58) Field of Classification Search
 CPC .......... G08G 1/166; H04W 4/44; H04W 4/46; H04W 4/40; G01S 19/485; G01S 19/428; G01S 19/51; G06T 7/73; G06T 2207/30252
 See application file for complete search history.

(56) References Cited

U.S. PATENT DOCUMENTS

| | | | |
|---|---|---|---|
| 2010/0061591 A1 | 3/2010 | Okada et al. | |
| 2010/0256852 A1* | 10/2010 | Mudalige | G08G 1/164 701/24 |
| 2012/0310516 A1 | 12/2012 | Zeng | |
| 2013/0282277 A1 | 10/2013 | Rubin et al. | |
| 2015/0127250 A1 | 5/2015 | Kim | |
| 2015/0294566 A1 | 10/2015 | Huang et al. | |
| 2016/0125608 A1* | 5/2016 | Sorstedt | B60R 1/00 348/148 |
| 2016/0332624 A1* | 11/2016 | Tezuka | B60W 30/16 |
| 2017/0166124 A1* | 6/2017 | Nakagawa | G08G 1/163 |
| 2017/0243485 A1* | 8/2017 | Rubin | H04W 4/46 |
| 2018/0275678 A1* | 9/2018 | Andert | G08G 1/164 |
| 2018/0313960 A1* | 11/2018 | Mudalige | G01S 19/43 |
| 2021/0199814 A1* | 7/2021 | Jia | G01S 19/40 |

FOREIGN PATENT DOCUMENTS

| | | |
|---|---|---|
| CN | 103632558 A | 3/2014 |
| CN | 104808220 A | 7/2015 |
| CN | 106052705 A | 10/2016 |
| CN | 106205178 A | 12/2016 |
| CN | 106371112 A | 2/2017 |
| CN | 106842269 A | 6/2017 |
| CN | 108051836 A | 5/2018 |
| CN | 108225320 A | 6/2018 |
| CN | 108490471 A | 9/2018 |
| CN | 108802773 A | 11/2018 |

* cited by examiner

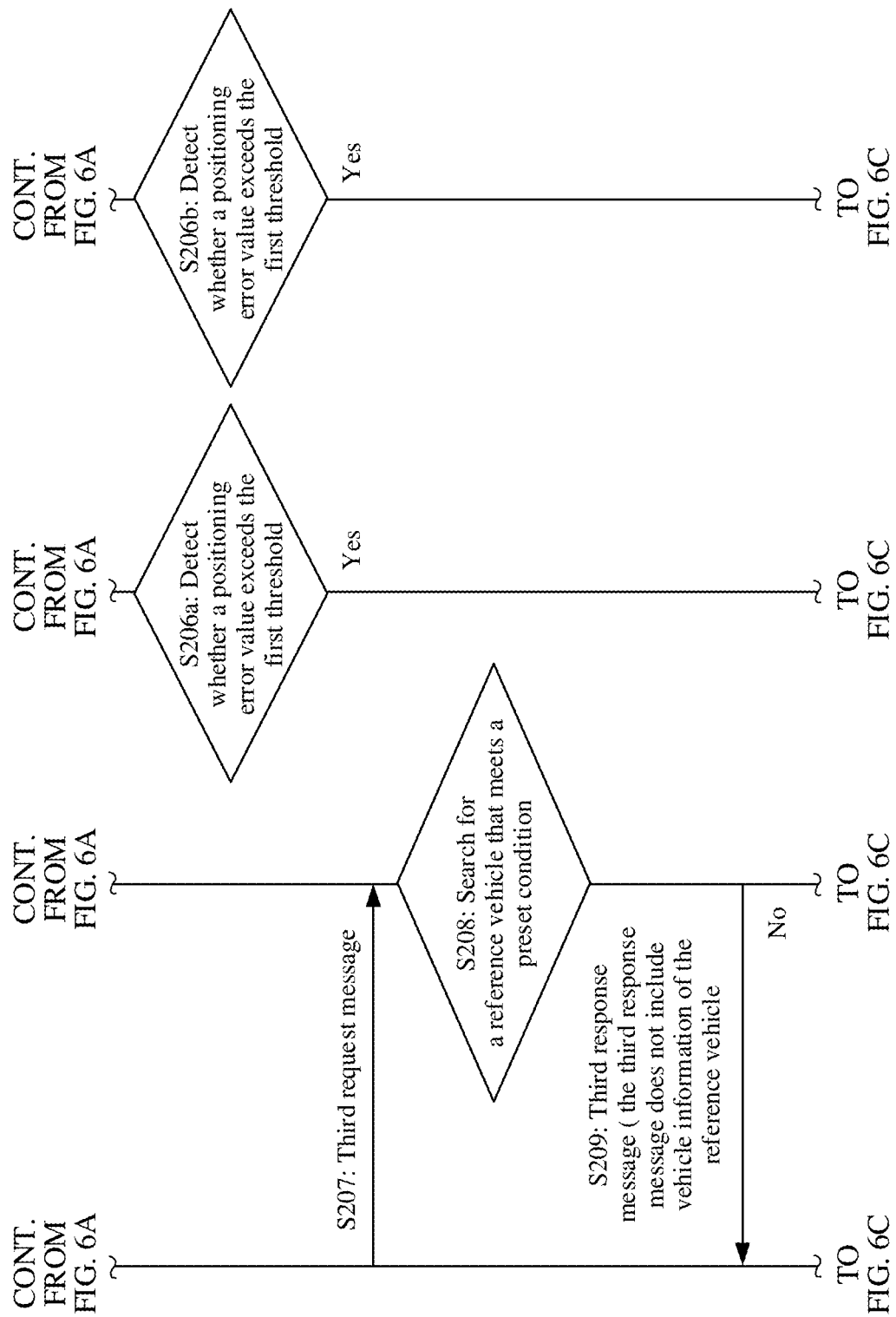

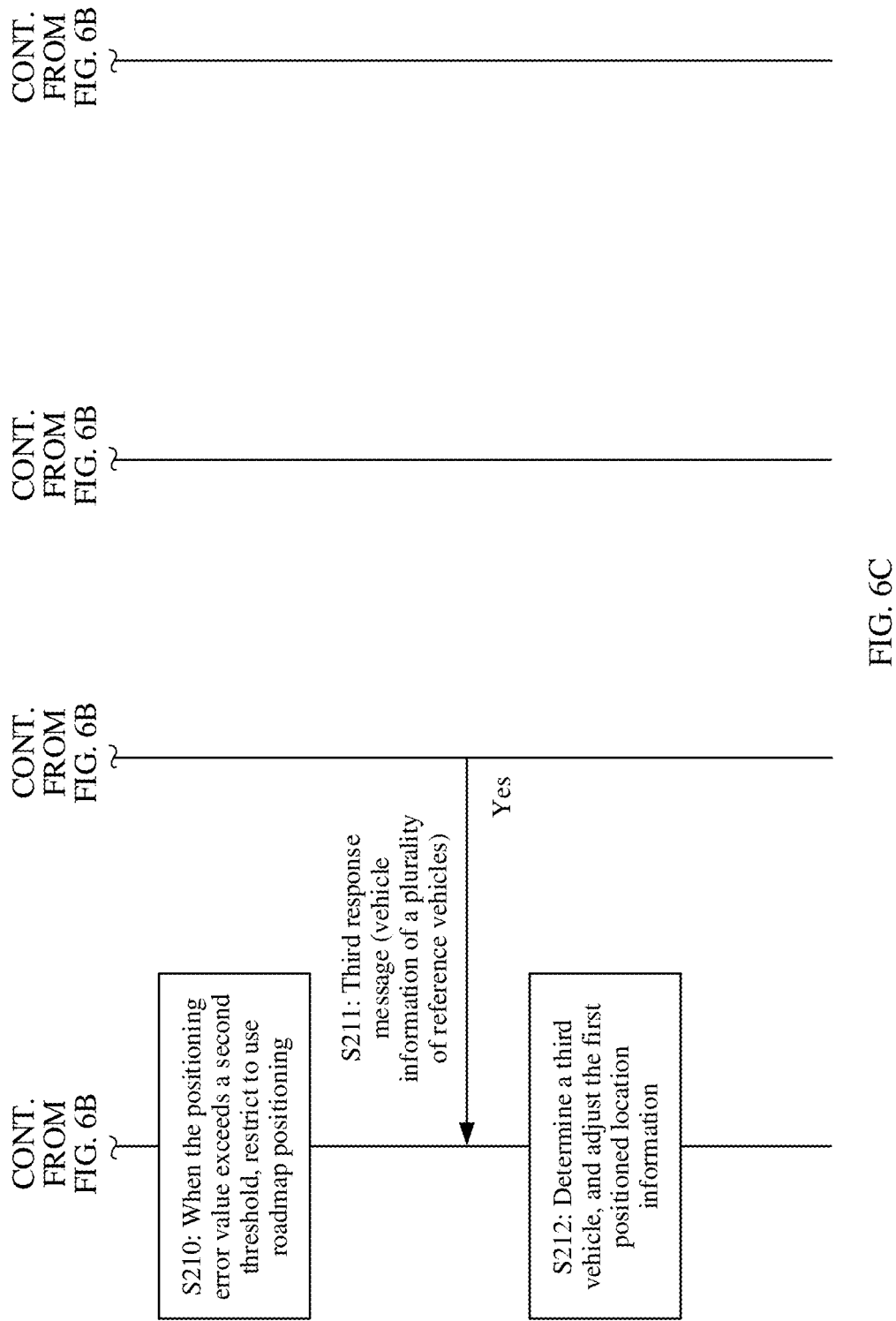

POSITIONED LOCATION ADJUSTMENT METHOD AND APPARATUS

CROSS-REFERENCE TO RELATED APPLICATIONS

This application is a continuation of International Application No. PCT/CN2019/103928, filed on Sep. 2, 2019, which claims priority to Chinese Patent Application No. 201811386522.4, filed on Nov. 20, 2018, both of which are hereby incorporated by reference in their entireties.

TECHNICAL FIELD

The embodiments relate to the field of communications technologies, and in particular, to a positioned location adjustment method and apparatus.

BACKGROUND

Vision positioning is established based on a conventional computer vision algorithm, integrates deep learning technology and big data training, and uses a visual sensor to implement high-precision and high-timeliness recognition and two-dimensional positioning of static and dynamic objects. Visual positioning may be applied to scenarios such as vehicle navigation positioning, unmanned aerial vehicle positioning, and indoor navigation, and may be applied to various environments such as rainy, snowy, cloudy, and sunny days and nights.

In visual positioning applied to a vehicle positioning scenario, visual images are collected by a visual sensor, for example, a camera lens or a laser radar on a vehicle, consistency information in a visual image sequence is extracted, and then a vehicle location is estimated based on a location change of the consistency information in the visual image sequence, to position the vehicle. The visual positioning applied to the vehicle positioning scenario may be classified into three methods according to a policy used to implement the visual positioning: global positioning based on a road sign library and image matching, visual-simultaneous localization and mapping (V-SLAM), and visual odometry (VO) based on local motion estimation.

In the global positioning method, a scene image needs to be collected in advance to establish a global map or a path database. When a vehicle needs to be positioned, an image collected by the vehicle is matched with a visual road sign feature library, and then a relative distance between a current image and a corresponding road sign is estimated to finally obtain a global high-precision location. In the V-SLAM method, an area through which the vehicle passes in a driving process is mapped and positioned based on collected visual information. In the VO method, a vehicle running parameter is estimated incrementally, and local motion estimation results are accumulated to track the vehicle based on a change of consistency information between adjacent images in the image sequence.

The V-SLAM method or the VO method may implement submeter level positioning. However, when the vehicle travels in a large area, if no complete visual road sign feature library is used for auxiliary correction, errors are continuously accumulated. This affects positioning precision and accuracy. The global positioning method also requires a complete visual road sign feature library to implement high-precision positioning. However, integrity of the visual road sign feature library cannot be ensured at present, and the errors cannot be corrected in the visual positioning. As a driving path increases, the visual positioning time period increases, and the errors are gradually accumulated. This affects positioning precision and accuracy.

SUMMARY

A problem to be resolved in the embodiments is to provide a positioned location adjustment method and apparatus, to assist in adjusting positioned location information of a first vehicle based on vehicle information of the reference vehicle, to implement an auxiliary correction of a positioning error of the first vehicle, and to further improve positioning precision and accuracy.

According to a first aspect of this embodiment, a positioned location adjustment method is provided, including:

sending, by a first vehicle, a first request message to a plurality of reference vehicles, where the first request message is used to request vehicle information of the reference vehicle, the first request message includes first positioned location information, and the first positioned location information is current location information of the first vehicle;

receiving, by the first vehicle, a first response message from the reference vehicle, where the first response message includes the vehicle information of the reference vehicle, and the vehicle information of the reference vehicle includes positioned location information of the reference vehicle, a positioning error value of the reference vehicle, and vehicle identifier information of the reference vehicle;

determining, by the first vehicle, a second vehicle from the plurality of reference vehicles based on the positioning error value of the reference vehicle; and adjusting, by the first vehicle, the first positioned location information based on positioned location information of the second vehicle and vehicle identifier information of the second vehicle, to obtain second positioned location information.

According to the first aspect of this embodiment, the first vehicle requests the vehicle information of the reference vehicle from the reference vehicle, and when determining the second vehicle, uses the second vehicle as a visual road sign used to correct a positioning error, and adjusts the first positioned location information based on the positioned location information and the vehicle identifier information of the second vehicle, to implement an auxiliary correction of the positioning error of the first vehicle, and to further improve positioning precision and accuracy.

In a possible implementation, the first vehicle selects a reference vehicle with a minimum positioning error value from the plurality of reference vehicles based on the positioning error value of the reference vehicle, and determines the selected reference vehicle as the second vehicle, to minimize impact of the positioning error value on the positioned location information of the second vehicle, so that the first vehicle corrects a positioning error to a maximum extent.

In a possible implementation, the first vehicle uses the second vehicle as a first visual road sign that matches the first positioned location information, uses the positioned location information of the second vehicle as positioned location information of the first visual road sign, uses the vehicle identifier information of the second vehicle as a positioning image of the first visual road sign, and adjusts the first positioned location information by using the positioned location information of the first visual road sign and the positioning image of the first visual road sign. The second vehicle is used as a visual road sign to correct positioning error, so that the first vehicle corrects the positioning error, to improve positioning precision and accuracy.

In a possible implementation, after obtaining the second positioned location information, the first vehicle collects an image of a current area in which the first vehicle is located, and determines a relative location between a feature in the image and the first vehicle; the first vehicle then calculates positioned location information of the feature in the image based on the second positioned location information and the relative location. The first vehicle sends the image and the positioned location information of the feature in the image to a vehicle to everything (V2X) server, so that the V2X server uses the feature in the image as a second visual road sign, generates road sign information of the second visual road sign based on the feature in the image and the positioned location information of the feature, and adds the road sign information of the second visual road sign to a visual road sign feature library. In this way, when passing through a positioned location identified by the second positioned location information, another vehicle may obtain the road sign information of the second visual road sign from a vehicle server to correct a positioning error.

In a possible implementation, after obtaining the second positioned location information, the first vehicle sends the second positioned location information of the first vehicle and vehicle identifier information of the first vehicle to the V2X server. The V2X server uses the first vehicle as a visual road sign, generates road sign information of the visual road sign based on the second positioned location information of the first vehicle and the vehicle identifier information of the first vehicle, and adds the road sign information of the visual road sign to a visual road sign feature library. In this way, another vehicle around the second positioned location information may correct a positioning error based on the road sign information of the visual road sign.

In a possible implementation, when a positioning error value of the first vehicle exceeds a first threshold, the first vehicle sends a second request message to a V2X server, where the second request message includes the first positioned location information, the second request message is used to request the V2X server to search for road sign information of a third visual road sign that matches the first positioned location information, and the third visual road sign is a visual road sign that matches the first positioned location information and that is stored in a visual road sign feature library. The second request message is used to request the V2X server to search the visual road sign feature library for the road sign information of the third visual road sign that matches the first positioned location information. If the V2X server finds the road sign information of the third visual road sign, the V2X server sends, to the first vehicle, a second response message that does not include the road sign information of the third visual road sign. When receiving the second response message, the first vehicle sends the first request message to the plurality of reference vehicles, to request the vehicle information of the reference vehicle. When the positioning error value of the first vehicle exceeds the first threshold and a visual road sign used to correct a positioning error cannot be obtained from the V2X server, the first vehicle obtains the vehicle information of the reference vehicle from a reference vehicle around the first vehicle, to correct the positioning error based on the vehicle information of the reference vehicle.

In a possible implementation, when a positioning error value of the first vehicle exceeds a first threshold, the first vehicle sends a second request message to an V2X server, where the second request message includes the first positioned location information, the second request message is used to request the V2X server to search for road sign information of a third visual road sign that matches the first positioned location information, the road sign information of the third visual road sign includes a positioning image of the third visual road sign, positioned location information of the third visual road sign, and a road sign attribute of the third visual road sign, and the road sign attribute is a fixed location or reported by a vehicle. If the V2X server finds road sign information of a plurality of third visual road signs, the V2X server sends, to the first vehicle, a second response message including the road sign information of the plurality of third visual road signs. When receiving the second response message, the first vehicle determines whether there is a third visual road sign whose road sign attribute is the fixed location in the plurality of third visual road signs; and if there is the third visual road sign whose road sign attribute is the fixed position, adjusts the first positioned location information based on the positioning image of the third visual road sign and the positioned location information of the third visual road sign, to obtain the second positioned location information. In other words, the third visual road sign whose road sign attribute is the fixed position is used as a visual road sign used to correct a positioning error, to improve positioning precision and accuracy.

In a possible implementation, the road sign information of the third visual road sign further includes a positioning error value of the third visual road sign. If there is no third visual road sign whose road sign attribute is the fixed position, the first vehicle selects a third visual road sign with a minimum positioning error value from the plurality of third visual road signs based on the positioning error value of the third visual road sign, determines the third visual road sign as a target third visual road sign, and adjusts the first positioned location information based on a positioning image of the target third visual road sign and positioned location information of the target third visual road sign, to obtain the second positioned location information. If there is no third visual road sign whose road sign attribute is the fixed position, the third visual road sign with the minimum positioning error value is selected to correct a visual road sign of a positioning error, to improve positioning precision and accuracy.

In a possible implementation, the road sign information of the third visual road sign further includes a positioning error value of the third visual road sign and a timestamp of the third visual road sign. If there is no third visual road sign whose road sign attribute is the fixed position, the first vehicle selects a third visual road sign with a minimum positioning error value and a latest timestamp from the plurality of third visual road signs based on the positioning error value of the third visual road sign and the timestamp of the third visual road sign, determines the third visual road sign as a target third visual road sign, and adjusts the first positioned location information based on a positioning image of the target third visual road sign and positioned location information of the target third visual road sign, to obtain the second positioned location information. If there is no third visual road sign whose road sign attribute is the fixed position, the third visual road sign with the minimum positioning error value and the latest timestamp is selected to correct a visual road sign of a positioning error, to improve positioning precision and accuracy.

In a possible implementation, if the first vehicle does not receive the first response message, the first vehicle sends a third request message to a V2X server, where the third request message is used to request the V2X server to search for a reference vehicle that meets a preset condition, and the preset condition is that: a positioning error value is less than a first threshold and is within a preset range of the first vehicle; and receives a third response message from the V2X server If the V2X server does not find the reference vehicle, the V2X server sends, to the first vehicle, a third response message that does not include the vehicle information of the reference vehicle. When the first vehicle receives the third response message, and when a positioning error value of the first vehicle exceeds a second threshold, the first vehicle is restricted to use visual positioning, to avoid continuous accumulation of the positioning error value. The vehicle information of the reference vehicle includes positioned location information of the reference vehicle, a positioning error value of the reference vehicle, and vehicle identifier information of the reference vehicle.

If the V2X server finds vehicle information of the plurality of reference vehicles, the V2X server sends a third response message including the vehicle information of the plurality of reference vehicles to the first vehicle. When receiving the third response message, the first vehicle determines a third vehicle from the plurality of reference vehicles based on the positioning error value of the reference vehicle, and adjusts the first positioned location information based on positioned location information of the third vehicle and vehicle identifier information of the third vehicle, to obtain the second positioned location information. The third vehicle is used as a visual road sign used to correct a positioning error, to improve positioning precision and accuracy.

In a possible implementation, the first request message further includes a traveling direction of the first vehicle, so that the reference vehicle determines, based on the first positioned location information of the first vehicle and the traveling direction of the first vehicle, whether to provide the first vehicle with the vehicle information of the reference vehicle.

The second request message further includes the traveling direction of the first vehicle, so that the V2X server searches for the third visual road sign based on the first positioned location information of the first vehicle and the traveling direction of the first vehicle.

The third request message further includes the traveling direction of the first vehicle, so that the V2X server searches for the reference vehicle based on the first positioned location information of the first vehicle and the traveling direction of the first vehicle.

According to a second aspect of this embodiment, a positioned location adjustment apparatus is provided, and the positioned location adjustment apparatus has a function of implementing the method provided in the first aspect. The function may be implemented by hardware, or may be implemented by hardware by executing corresponding software. The hardware or the software includes one or more modules corresponding to the foregoing function.

In a possible implementation, the positioned location adjustment apparatus includes a processing module and a first transceiver module. The first transceiver module is configured to: send a first request message to a plurality of reference vehicles, where the first request message is used to request vehicle information of the reference vehicle, the first request message includes first positioned location information, and the first positioned location information is current location information of the first vehicle; and receive a first response message from the reference vehicle, where the first response message includes the vehicle information of the reference vehicle, and the vehicle information of the reference vehicle includes positioned location information of the reference vehicle, a positioning error value of the reference vehicle, and vehicle identifier information of the reference vehicle. The processing module is configured to: determine a second vehicle from the plurality of reference vehicles based on the positioning error value of the reference vehicle, and adjust the first positioned location information based on positioned location information of the second vehicle and vehicle identifier information of the second vehicle, to obtain second positioned location information.

In a possible implementation, the positioned location adjustment apparatus includes a processor, a transceiver, and a memory. The transceiver is configured to receive and send information, the memory stores a computer executable instruction, the processor is connected to the memory and the transceiver by a bus, and the processor executes the computer executable instruction stored in the memory, so that the positioned location adjustment apparatus performs the following operation: controlling the transceiver to send a first request message to a plurality of reference vehicles, where the first request message is used to request vehicle information of the reference vehicle, the first request message includes first positioned location information, and the first positioned location information is current location information of a first vehicle; controlling the transceiver to receive a first response message from the reference vehicle, where the first response message includes the vehicle information of the reference vehicle, and the vehicle information of the reference vehicle includes positioned location information of the reference vehicle, a positioning error value of the reference vehicle, and vehicle identifier information of the reference vehicle; determining a second vehicle from the plurality of reference vehicles based on the positioning error value of the reference vehicle; and adjusting the first positioned location information based on positioned location information of the second vehicle and vehicle identifier information of the second vehicle, to obtain second positioned location information.

The apparatus and the method are based on similar concepts, and for a problem-resolving principle and beneficial effects of the apparatus, refer to the method in the first aspect and beneficial effects brought thereof. Therefore, for implementation of the apparatus, refer to implementation of the method. Repeated content is not described again.

According to a third aspect of an embodiment, a computer-readable storage medium is provided. The computer-readable storage medium stores an instruction, and when the instruction is run on a computer, the computer is enabled to perform the method according to the first aspect.

According to a fourth aspect of an embodiment, a computer program product including an instruction is provided. When the computer program product runs on a computer, the computer is enabled to perform the method according to the first aspect.

According to a fifth aspect of this embodiment, a positioned location adjustment method is provided, including:

receiving, by a reference vehicle, a first request message from a first vehicle, where the first request message includes first positioned location information of the first vehicle;

when detecting that a positioning error value of the reference vehicle is less than a first threshold, extracting, by the reference vehicle, positioned location information of the reference vehicle and vehicle identifier information of the reference vehicle; and sending, by the reference vehicle, a first response message to the first vehicle, where the first response message includes vehicle information of the reference vehicle, and the vehicle information of the reference vehicle includes the positioned location information of the reference vehicle, the positioning error value of the reference vehicle, and the vehicle identifier information of the reference vehicle.

According to the fifth aspect of this embodiment, when receiving the first request message from the first vehicle, the reference vehicle detects whether the positioning error value of the reference vehicle is less than the first threshold, and feeds back the vehicle information of the reference vehicle to the first vehicle only when the positioning error value of the reference vehicle is less than the first threshold, so that the first vehicle corrects a positioning error based on the vehicle information of the reference vehicle, to improve positioning precision and accuracy.

In a possible implementation, the first request message further includes a traveling direction of the first vehicle, so that the reference vehicle determines, based on the first positioned location information of the first vehicle and the traveling direction of the first vehicle, whether to provide the first vehicle with the vehicle information of the reference vehicle.

According to a sixth aspect of this embodiment, a positioned location adjustment apparatus is provided, and the positioned location adjustment apparatus has a function of implementing the method provided in the first aspect. The function may be implemented by hardware, or may be implemented by hardware by executing corresponding software. The hardware or the software includes one or more modules corresponding to the foregoing function.

In a possible implementation, the positioned location adjustment apparatus includes a processing module and a first transceiver module. The first transceiver module is configured to receive a first request message from a first vehicle, where the first request message includes first positioned location information of the first vehicle. The processing module is configured to: when it is detected that a positioning error value of a reference vehicle is less than a first threshold, extract positioned location information of the reference vehicle and vehicle identifier information of the reference vehicle. The first transceiver module is further configured to send a first response message to the first vehicle, where the first response message includes vehicle information of the reference vehicle, and the vehicle information of the reference vehicle includes the positioned location information of the reference vehicle, the positioning error value of the reference vehicle, and the vehicle identifier information of the reference vehicle.

In a possible implementation, the positioned location adjustment apparatus includes a processor, a transceiver, and a memory. The transceiver is configured to receive and send information, the memory stores a computer executable instruction, the processor is connected to the memory and the transceiver by using a bus, and the processor executes the computer executable instruction stored in the memory, so that the positioned location adjustment apparatus performs the following operation: controlling the transceiver to receive a first request message from a first vehicle, where the first request message includes first positioned location information of the first vehicle; and when it is detected that a positioning error value of a reference vehicle is less than a first threshold, extracting positioned location information of the reference vehicle and vehicle identifier information of the reference vehicle; and controlling the transceiver to send a first response message to the first vehicle, where the first response message includes vehicle information of the reference vehicle, and the vehicle information of the reference vehicle includes the positioned location information of the reference vehicle, the positioning error value of the reference vehicle, and the vehicle identifier information of the reference vehicle.

The apparatus and the method are based on similar concepts, and for a problem-resolving principle and beneficial effects of the apparatus, refer to the method in the first aspect and beneficial effects brought thereof. Therefore, for implementation of the apparatus, refer to implementation of the method. Repeated content is not described again.

According to a seventh aspect of this embodiment, a computer-readable storage medium is provided. The computer-readable storage medium stores an instruction, and when the instruction is run on a computer, the computer is enabled to perform the method according to the fifth aspect.

According to an eighth aspect of this embodiment, a computer program product including an instruction is provided. When the computer program product runs on a computer, the computer is enabled to perform the method according to the fifth aspect.

BRIEF DESCRIPTION OF DRAWINGS

To describe the solutions in the embodiments or in the background more clearly, the following briefly describes the accompanying drawings for describing the embodiments or the background.

FIG. 6B is a schematic flowchart of a positioned location adjustment method according to a second embodiment;

FIG. 6C is a schematic flowchart of a positioned location adjustment method according to a second embodiment;

DETAILED DESCRIPTION OF THE EMBODIMENTS

The following describes the solutions in the embodiments with reference to the accompanying drawings in the embodiments. In descriptions, unless otherwise specified, "I" indicates an "or" relationship between associated objects. For example, A/B may represent A or B. In the embodiments, "and/or" merely describes an association relationship between associated objects and represents that three relationships may exist. For example, A and/or B may represent the following three cases: only A exists, both A and B exist, and only B exists, where A and B may be in a singular form or plural form. In addition, in the descriptions, unless otherwise specified, "a plurality of" means two or more than two. "At least one of the following items (pieces)" or a similar expression thereof means any combination of the items, and includes any combination of one item (piece) or a plurality of items (pieces). For example, at least one (one piece) of a, b, or c may indicate: a, b, c, a-b, a-c, b-c, or a-b-c, where a, b, and c may be singular or plural. In addition, to describe the solutions in the embodiments, terms such as "first" and "second" are used in the embodiments to distinguish between same items or similar items that have basically same functions and purposes. A person of ordinary skill in the art may understand that the terms such as "first" and "second" do not limit a quantity or an execution sequence, and the terms such as "first" and "second" do not indicate a definite difference.

In addition, the network architecture and the application scenario described in the embodiments are intended to describe the solutions in the embodiments more clearly, and is non-limiting on the solutions provided in the embodiments. A person of ordinary skill in the art may understand that: with the evolution of the network architecture and the emergence of new service scenarios, the solutions provided in the embodiments are also applicable to similar problems.

Figure 1:
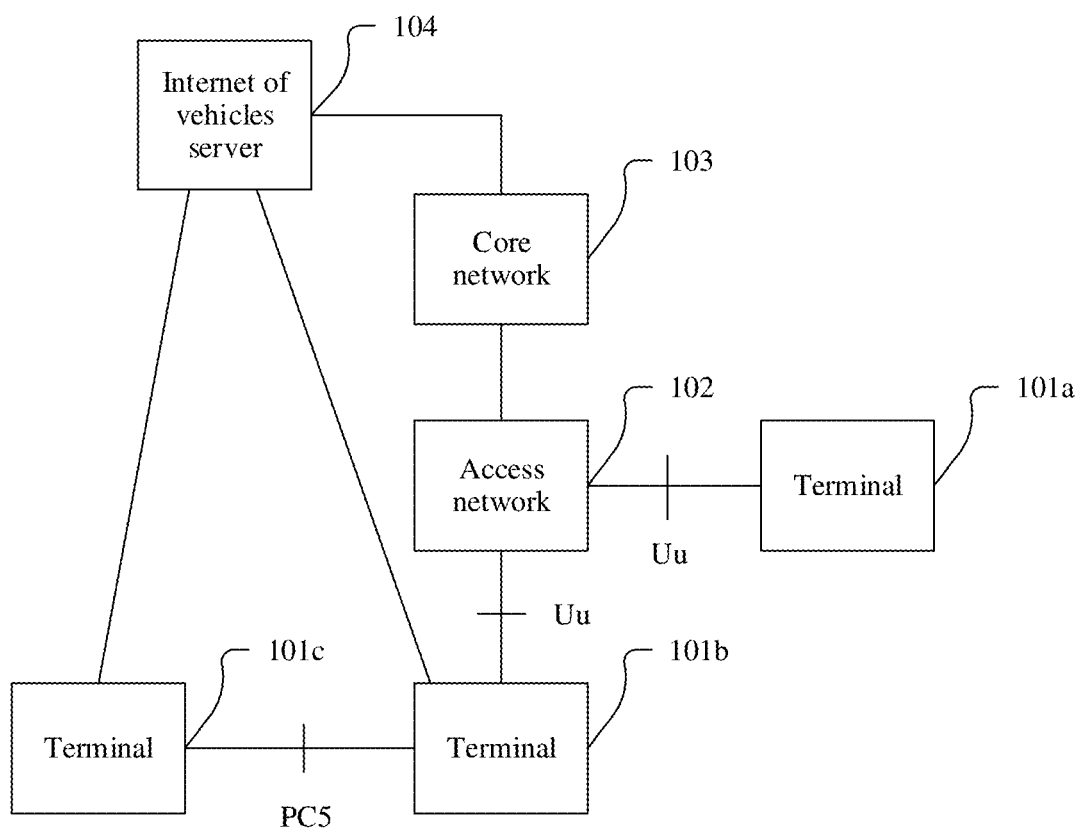
FIG. 1 is a schematic diagram of a network architecture of an V2X communications system.

FIG. 1 is a schematic diagram of a network architecture of a V2X communications system. The V2X system is a dynamic mobile communications system that enables communication between vehicles and public networks. It allows vehicles to interact with vehicles, roads, people, and sensors. The V2X can implement information sharing by interconnecting vehicles with vehicles, vehicles with people, and vehicles with roads. It collects information about vehicles, roads, and environments, and processes, computes, shares, and securely releases the information collected from a plurality of sources on an information network platform. The V2X system provides effective guidance and supervision for vehicles based on different function requirements and provides professional multimedia and mobile internet application services. The schematic diagram of the network architecture shown in FIG. 1 includes a terminal 101a, a terminal 101b, a terminal 101c, an access network 102, a core network 103, and an V2X server 104.

The terminal 101a, the terminal 101b, and the terminal 101c may be a vehicle having an in-vehicle terminal, the in-vehicle terminal, a sensor device, a device on two sides of a road, a user terminal of a pedestrian, or the like. The terminal supports a PC5 communication mode and a Uu communication mode. The PC5 communication mode is a direct communication mode between terminals. For example, the terminal 101b and the terminal 101c directly communicate with each other by using an air interface PC5 interface. In this case, the terminal 101b and the terminal 101c may directly transmit data, information, a message, and the like by using the PC5 interface. The Uu communication mode is that: the terminal communicates with the V2X server 104 by using the access network 102 and the core network 103. For example, the terminal 101a and the terminal 101b access the access network 102 by using an air interface Uu, the access network 102 is connected to the core network 103, and the core network 103 is connected to the V2X server 104, the terminal 101a or the terminal 101b sends uplink data to the V2X server 104 by using the access network 102 and the core network 103, and the V2X server 104 may send downlink data to the terminal 101a or the terminal 101b by using the core network 103 and the access network 102. Alternatively, the terminal may directly communicate with the V2X server 104. For example, the terminal 101c may directly transmit data, information, a message, and the like with the V2X server 104.

The access network 102 may be an access device in a second generation (2G) mobile communications system, for example, a base transceiver station (BTS) in a global system for mobile communications (GSM) or a code division multiple access (CDMA) system; or may be an access device in a third generation (3G) mobile communications system, for example, a NodeB in a wideband CDMA (WCDMA) system; or may be an evolved NodeB (eNB or e-NodeB) in a long term evolution (LTE) system; or may be an access device in a fourth-generation (4G) mobile communications system; or may be an access device in a fifth-generation (5G) mobile communications system, or may even be an access device in a future communications system.

The core network 103 may be a core network in the 2G, 3G, LTE, 4G, or 5G system, for example, may be an evolved packet core (EPC) in the LTE system.

The V2X server 104 is configured to manage and monitor the terminal in the V2X system, and provide various services for the terminal, for example, deliver downlink data to the terminal, and receive uplink data from the terminal. The V2X server 104 may be an V2X application server (AS), or may be a third-party server, or may be an V2X platform. The name of the V2X server does not constitute is non-limiting on this embodiment, and another name used to describe a function of the V2X server should fall within the protection scope of this embodiment.

Figure 2:
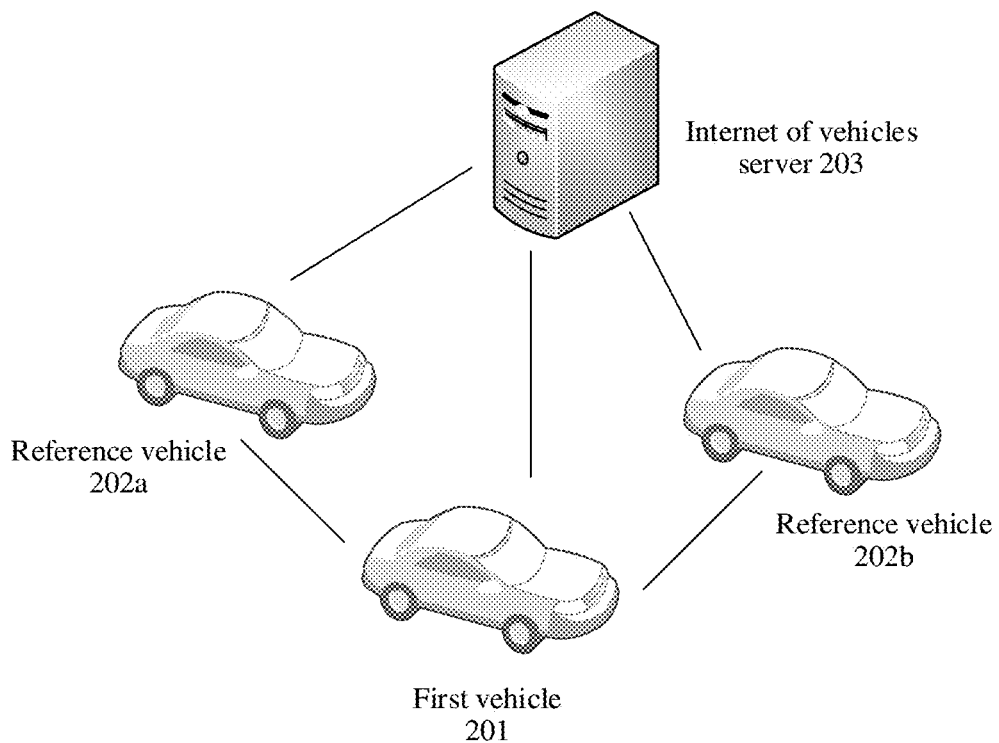
FIG. 2 is a schematic diagram of a network architecture to which an embodiment is applied.

FIG. 2 is a schematic diagram of a network architecture to which an embodiment is applied. The schematic diagram of the network architecture includes a first vehicle 201, a reference vehicle 202a, a reference vehicle 202b, and an V2X server 203.

In this embodiment, the first vehicle 201 is a vehicle whose positioned location needs to be adjusted, and the reference vehicle 202a and the reference vehicle 202b are vehicles around the first vehicle 201, and are used to assist the first vehicle in adjusting the positioned location. It should be noted that a quantity of reference vehicles shown in FIG. 2 is used as an example, and is non-limiting on this embodiment. In actual application, there may be one or more reference vehicles, depending on the case. A specific surrounding range is related to a communication distance between vehicles, and a specific value is not limited in this embodiment.

The V2X server 203 is the V2X server 104 in FIG. 1. In this embodiment, the V2X server 203 is configured to manage a visual road sign feature library, for example, update the visual road sign feature library, and add road sign information of a visual road sign; and is further configured to: when receiving a query request of a terminal, search for the road sign information of the visual road sign, and deliver the found road sign information of the visual road sign to the terminal. The visual road sign feature library includes road sign information of a plurality of visual road signs, and the road sign information may include a positioning image of the road sign, positioned location information of the road sign, and a road sign attribute. The road sign information may further include a positioning error value of the road sign, or may further include a positioning error value of the road sign and a timestamp created by the road sign. The road sign attribute can be a fixed location or reported by a vehicle. If a road sign attribute of a visual road sign is reported by a vehicle, it indicates that the visual road sign is created based on information reported by the vehicle, and there is a specific error. If a road sign attribute of a visual road sign is the fixed location, it indicates that the visual road sign is preset by a map vendor or the like, and positioned location information of the visual road sign is accurate and has no error.

A current visual positioning method depends on the visual road sign feature library. However, integrity of the current visual road sign feature library cannot be ensured. As a result, a vehicle cannot modify a visual positioning error during driving. As a driving path increases, a visual positioning time period increases, and the error gradually accumulates. This affects positioning precision and accuracy. Therefore, embodiments provide a positioned location adjustment method and apparatus, to assist a first vehicle in adjusting positioned location information of the first vehicle based on vehicle information of a reference vehicle, to implement an auxiliary correction of a positioning error of the first vehicle in time, and to further improve positioning precision and accuracy.

In this embodiment, when the first vehicle needs to adjust the positioned location information of the first vehicle, the first vehicle may directly request, from the reference vehicle, to obtain the vehicle information of the reference vehicle to adjust the positioned location information of the first vehicle, or may request, from the V2X server 203, to obtain the vehicle information of the reference vehicle. Then, when receiving the vehicle information of the reference vehicle from the V2X server 203, the first vehicle 201 adjusts the positioned location information of the first vehicle based on the vehicle information of the reference vehicle.

Figure 3A:
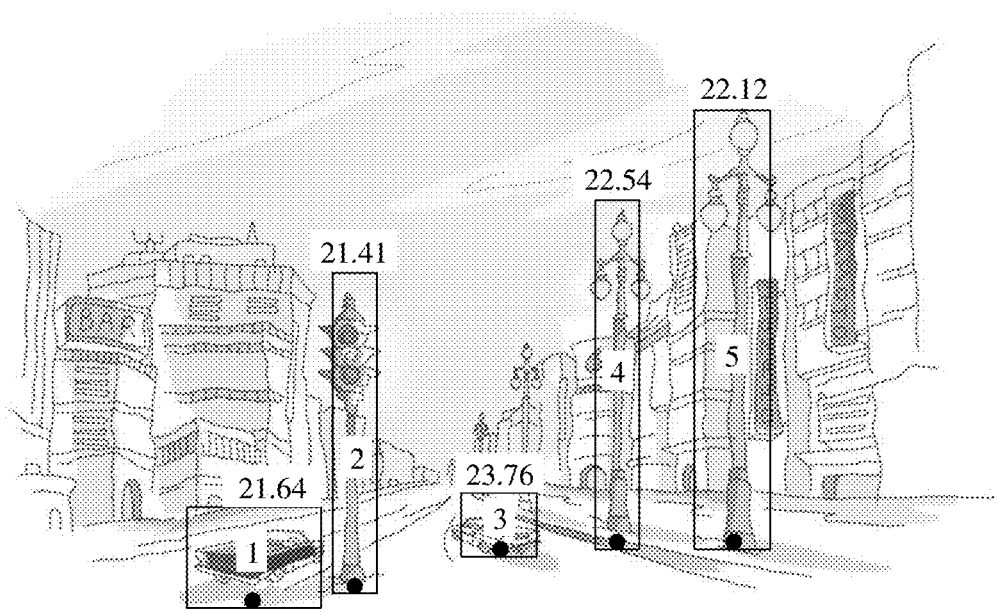
FIG. 3a is a first schematic diagram of a scenario to which an embodiment is applied.

This embodiment may be applied to a scenario in which a visual road sign feature library is incomplete. In this scenario, when a vehicle needs to correct positioned location information of the vehicle, the vehicle cannot obtain, from the visual road sign feature library, the road sign information of the visual road sign used for correction. For example, a schematic diagram 1 of a scenario shown in FIG. 3a is a visual image collected by performing visual positioning when a vehicle travels on an urban road. Features identified by 1, 2, 3, 4, and 5 in FIG. 3a may be used as visual road signs, 21.64, 21.41, 23.76, 22.54, and 22.12 indicate relative location information between the vehicle and the visual road sign. However, due to blocking of a building or trees on both sides of a road, it cannot be ensured that the vehicle obtains, in time during driving, a visual road sign used to correct a positioning error value from a visual road sign feature library. As a result, a positioning error gradually increases. The embodiments may be further applied to a scenario in which satellite positioning data of a global positioning system (GPS) cannot be accurately obtained. For example, in FIG. 3b, when a vehicle is in an underground garage, the satellite positioning data of the GPS cannot be continuously and accurately obtained, resulting in an inaccurate positioned location.

Figure 3B:
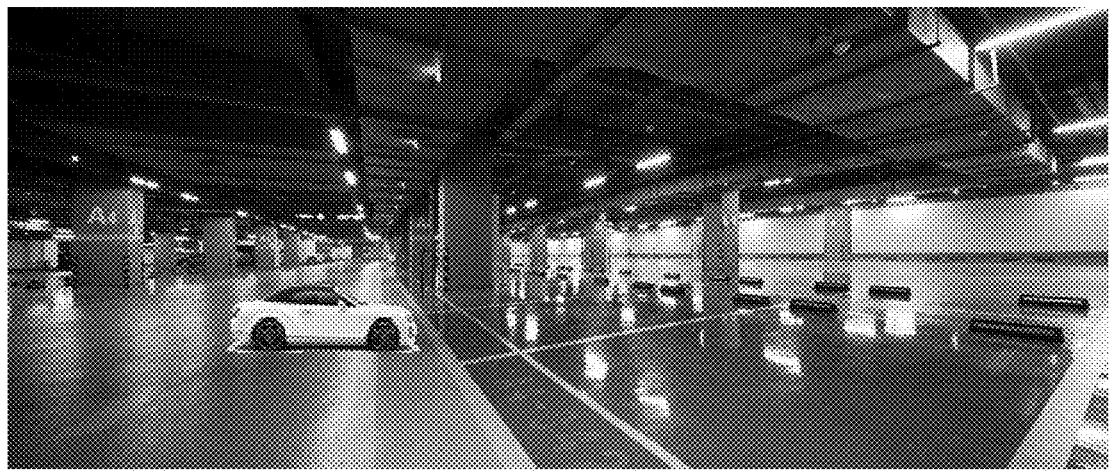
FIG. 3b is a second schematic diagram of a scenario to which an embodiment is applied.

It should be noted that the schematic diagrams of the scenarios shown in FIG. 3a and FIG. 3b are used as examples, and is non-limiting on the embodiments.

To facilitate understanding of the embodiments, the following first describes several nouns or terms used in the embodiments.

A visual road sign (visual road sign) uses a visual image as a feature and includes a reference mark of location information, for example, the visual road signs 1, 2, 3, 4, and 5 identified in FIG. 3a, and relative location information of a vehicle that is identified on each visual road sign. road sign information of a visual road sign may include a positioning image of the visual road sign, positioned location information of the visual road sign, and a road sign attribute of the visual road sign. The road sign information of the visual road sign may further include a positioning error value of the visual road sign, or may further include a positioning error value of the visual road sign and a timestamp created by the visual road sign.

The positioning image of the visual road sign may include rich image features, for example, a vehicle, a traffic signal light, and a street lamp in FIG. 3a. The positioned location information of the visual road sign may be preset by a map vendor or the like, and a corresponding road sign attribute is a fixed location. In this case, the positioned location information is accurate. For example, the positioned location information of the traffic signal light and the street lamp in FIG. 3a is accurate and fixed. Alternatively, the positioned location information of the visual road sign may be positioned location information obtained by the vehicle by using the GPS, or positioned location information obtained by correcting the positioned location information obtained by the GPS, and a corresponding road sign attribute is reporting by the vehicle. In this case, the positioned location information has a specific error, for example, in FIG. 3a, there is a specific error in the positioned location information of the vehicle. When the road sign attribute is reporting by the vehicle, the road sign information of the visual road sign further includes the positioning error value of the visual road sign, or further includes the positioning error value of the visual road sign and the timestamp created by the visual road sign. It may be understood that accuracy of the positioned location information of the fixed location attribute is higher than accuracy of the positioned location information of the attribute reported by the vehicle.

Positioned location information is used to identify a positioned location. The positioned location may be a geographical location, and may be represented by using a longitude, a latitude, or an altitude.

Figure 4:
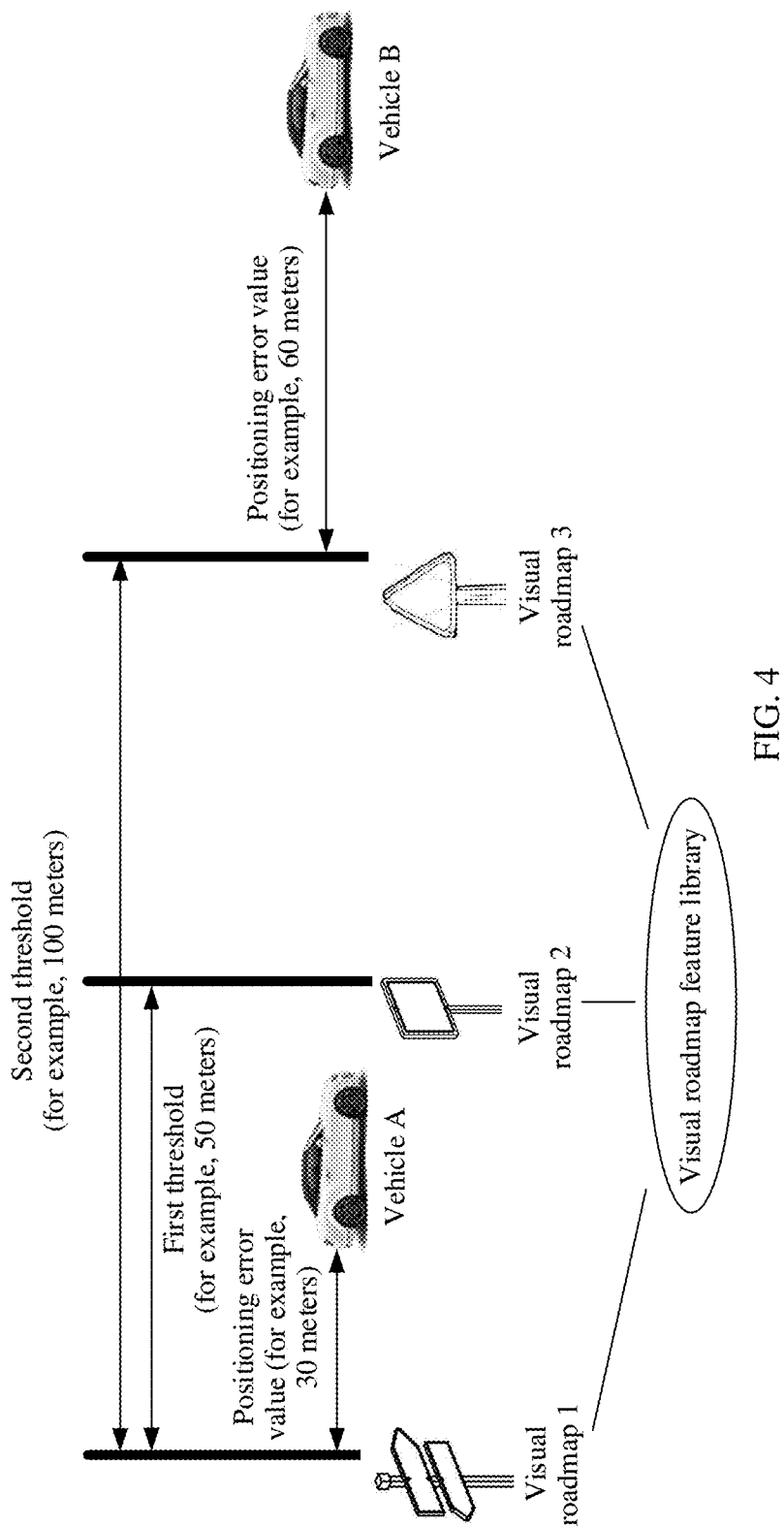
FIG. 4 is a schematic diagram of a visual road sign and a positioning error value.

A positioning error value (location error) is a distance traveled by a vehicle after obtaining a visual road sign used to correct a positioning error. For details, refer to a schematic diagram of a visual road sign and a positioning error value shown in FIG. 4. A value and an image of the visual road sign in FIG. 4 are used as examples, and are non-limiting on this embodiment. In FIG. 4, a visual road sign 1, a visual road sign 2, and a visual road sign 3 are visual road signs used to correct a positioning error. Starting from the visual road sign 1, a vehicle A travels at a distance of 30 meters, in other words, a positioning error value of the vehicle A relative to the visual road sign 1 is 30 meters, similarly, a positioning error value of a vehicle B relative to the visual road sign 3 is 60 meters.

When the positioning error value of the vehicle A relative to the visual road sign 1 exceeds a first threshold, the vehicle A needs to request, from a visual road sign feature library, to obtain road sign information of the visual road sign 2 that is used to correct the positioning error. If the visual road sign feature library cannot provide the vehicle A with the road sign information of the visual road sign 2, the positioning error value of the vehicle A is increasingly large. If the positioning error value of the vehicle A relative to the visual road sign 1 exceeds a second threshold, positioned location information of the vehicle A has low reliability. This affects positioning precision and accuracy of the vehicle A.

It should be noted that in this embodiment, the name of the positioning error value is used as an example for description. Other names used to describe the positioning error value may fall within the protection scope of this embodiment, for example, a location error value.

A road sign positioning error value (label location error) is when a vehicle reports road sign information of a visual road sign, a distance that has been traveled by the vehicle since location calibration is obtained last time.

The following describes the positioned location adjustment method provided in the embodiments. It should be noted that, in the following embodiments, names of messages or names of parameters in messages between devices are merely examples, and the messages or the parameters may have other names in implementation. This is not limited in the embodiments.

Figure 5A:
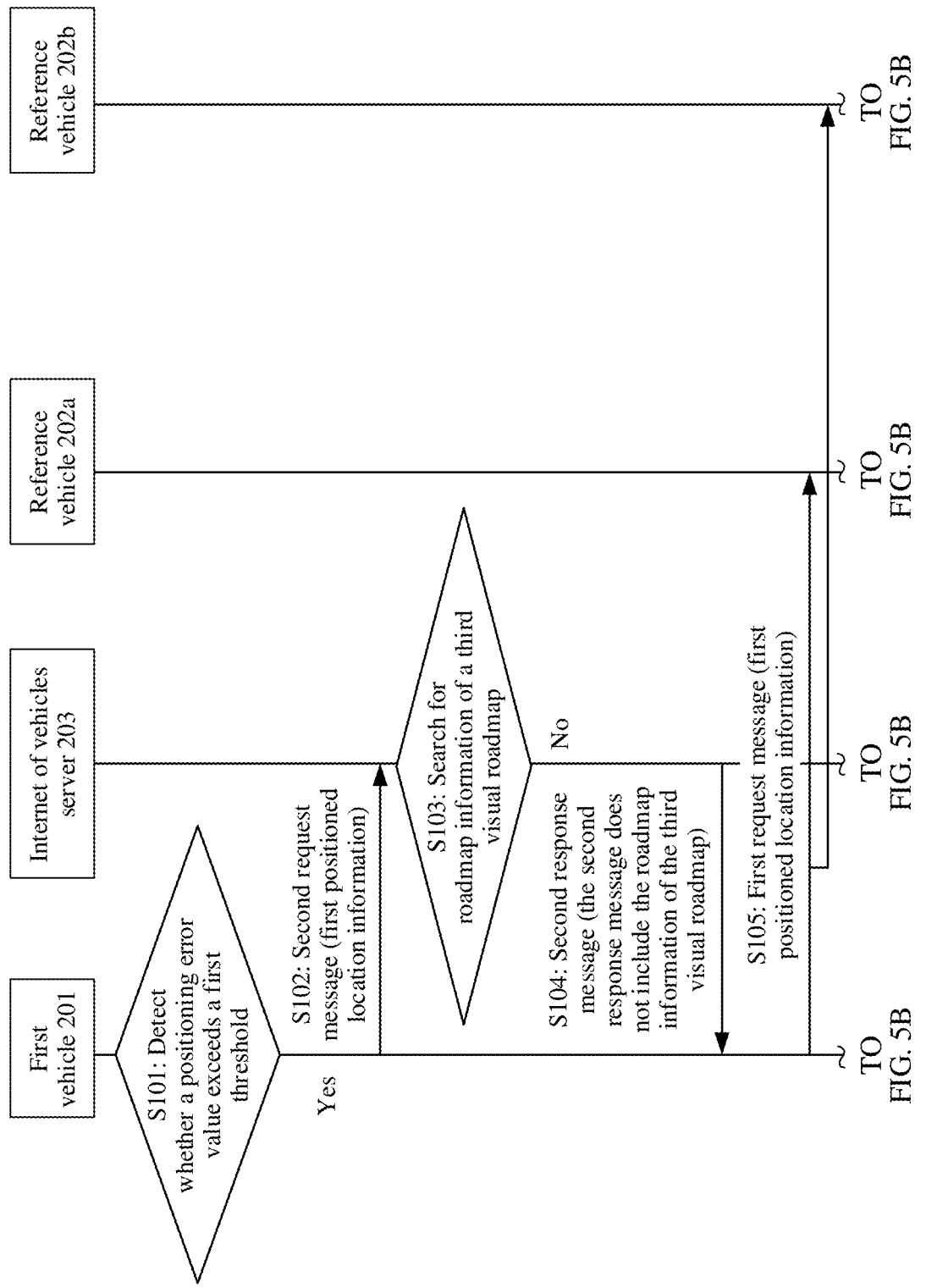
FIG. 5A is a schematic flowchart of a positioned location adjustment method according to a first embodiment.
Figure 5B:
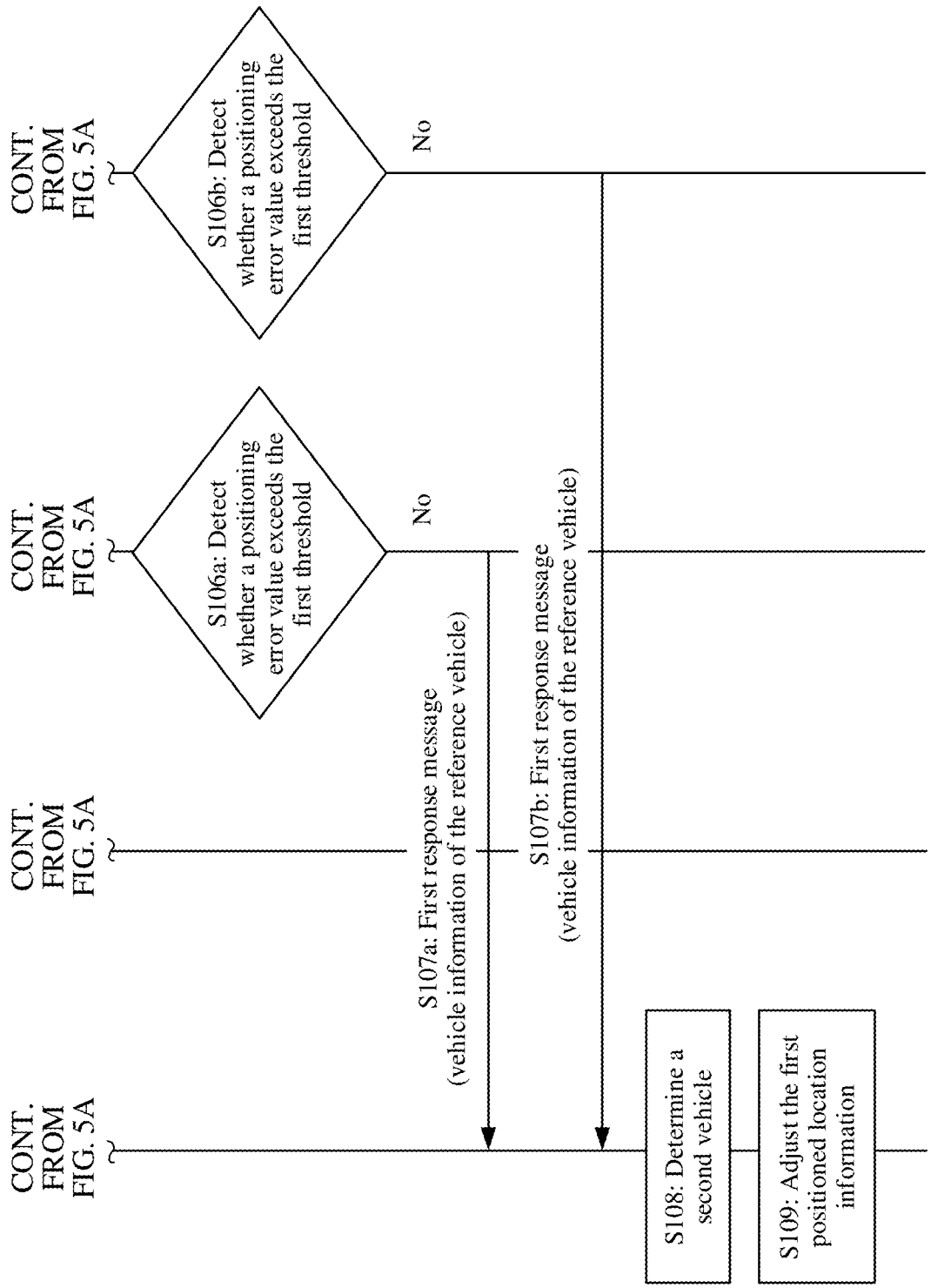
FIG. 5B is a schematic flowchart of a positioned location adjustment method according to a first embodiment.

An example in which an embodiment is applied to the schematic diagram of the network architecture shown in FIG. 2 is used. FIG. 5A and FIG. 5B are a schematic flowchart of a positioned location adjustment method according to Embodiment 1. The embodiment shown in FIG. 5A and FIG. 5B may include, but is not limited to, the following steps.

Step S101: a first vehicle 201 detects whether a positioning error value of the first vehicle 201 exceeds a first threshold.

Starting from obtaining a visual road sign used to correct a positioning error, the first vehicle 201 measures the positioning error value of the first vehicle 201 in real time during driving, and detects, in real time, whether the positioning error value of the first vehicle 201 exceeds the first threshold.

The first threshold is used to determine whether a new visual road sign is required to correct the positioning error. If the positioning error value of the first vehicle 201 exceeds the first threshold, it indicates that the first vehicle 201 needs the new visual road sign to correct the positioning error. The first threshold may be preset by a vehicle positioning system. For different types of vehicles or different positioning systems, the first threshold may be different. In this embodiment the first threshold is not limited to a specific value.

Step S102: if a detection result is that: the positioning error value of the first vehicle 201 exceeds the first threshold, the first vehicle 201 sends a second request message to an V2X server 203. Correspondingly, the V2X server 203 receives the second request message from the first vehicle 201.

When detecting that the positioning error value of the first vehicle 201 exceeds the first threshold, the first vehicle 201 needs the new visual road sign to correct the positioning error. In this case, the first vehicle 201 sends the second request message to the V2X server 203. The first vehicle 201 may send the second request message to the V2X server 203 in a Uu communication mode, in other words, the first vehicle 201 sends the second request message to the V2X server 203 by using an access network and a core network. Alternatively, the first vehicle 201 may directly send the second request message to the V2X server 203.

The second request message includes first positioned location information of the first vehicle 201 and is used to request the V2X server 203 to search for road sign information of a third visual road sign that matches the first positioned location information. In other words, the second request message is used to request the V2X server 203 to search, based on the first positioned location information of the first vehicle, for the road sign information of the third visual road sign that matches the first positioned location information. The third visual road sign that matches the first positioned location information is searched for, in other words, whether there is a visual road sign around a location identified by the first positioned location information is searched for, and the visual road sign is used as the matched third visual road sign. The road sign information of the third visual road sign may be used by the first vehicle 201 to correct a positioning error existing in the first positioned location information, to reduce the positioning error and improve accuracy of corrected positioned location information.

The first positioned location information is the current location information of the first vehicle 201. During driving, the vehicle may collect current location information of the vehicle in one or more the following manners: a GPS, a Beidou navigation satellite system (BDS), a Galileo satellite navigation system, a global navigation satellite system, visual positioning, or the like. However, the collected current location information may be inaccurate. The first positioned location information may be the current location information collected by the first vehicle 201 when the positioning error value exceeds the first threshold.

In a possible implementation, the second request message further includes a traveling direction of the first vehicle 201, so that the V2X server 203 better searches, based on the first positioned location information and the traveling direction of the first vehicle 201, for the third visual road sign that matches the first positioned location information. For example, if a positioned location identified by the first positioned location information is A, and the driving direction of the first vehicle 201 is east, the V2X server 203 may search for the third visual road sign in the east direction of the positioned location A. Compared with a search range in which the third visual road sign is searched only based on the first positioned location information, a search range may be narrowed based on the first positioned location information and the traveling direction of the first vehicle 201, to search for the third visual road sign more quickly.

It may be noted that, in this embodiment, the first positioned location information, or the first positioned location information and the driving direction is/are carried by using the second request message, and the second request message may be one of reporting messages sent by the vehicle to the V2X server. The first positioned location information, or the first positioned location information and the driving direction may be carried by using another message or may be directly sent by the vehicle to the V2X server without being carried by using any message.

Step S103: the V2X server 203 searches for the road sign information of the third visual road sign.

When receiving the second request message, the V2X server 203 searches, based on the first positioned location information or based on the first positioned location information and the driving direction, a visual road sign feature library for the road sign information of the third visual road sign that matches the first positioned location information. For example, the V2X server 203 searches the visual road sign feature library for whether there is the third visual road sign around the positioned location identified by the first positioned location information, and if there is the third visual road sign, obtains the road sign information of the third visual road sign. The search range may be preset by the V2X server 203 or may be set by an administrator. A specific value is not limited in this embodiment. A quantity of third visual road signs may be zero, one, or more, depending on the case.

Step S104: if there is no road sign information of the third visual road sign, the V2X server 203 sends a second response message to the first vehicle 201, where the second response message does not include the road sign information of the third visual road sign. Correspondingly, the first vehicle 201 receives the second response message from the V2X server 203.

If there is no road sign information of the third visual road sign, in other words, the V2X server 203 does not find the third visual road sign in the visual road sign feature library, the V2X server 203 sends a second response message to the first vehicle 201, where the second response message does not include the road sign information of the third visual road sign and is used to notify the first vehicle 201 that there is no third visual road sign used to correct the positioning error around the positioned location identified by the first positioned location information.

In a possible implementation, when there is no road sign information of the third visual road sign, the V2X server 203 sends an indication message to the first vehicle 201, where the indication message is used to indicate that there is no third visual road sign used to correct the positioning error around the positioned location identified by the first positioned location information. In other words, when there is no road sign information of the third visual road sign, the V2X server 203 notifies, by using a message, the first vehicle 201 that there is no road sign information of the third visual road sign.

Step S105: the first vehicle 201 sends a first request message to a reference vehicle 202*a* and a reference vehicle 202*b*. Correspondingly, the reference vehicle 202*a* receives the first request message from the first vehicle 201, and the reference vehicle 202*b* receives the first request message from the first vehicle 201.

The first vehicle 201 may send the first request message to one or more reference vehicles in a PC5 communication mode when learning that there is no road sign information of the third visual road sign in the visual road sign feature library, where the first request message is used to request vehicle information of the reference vehicle. If there is a reference vehicle around the first vehicle 201, the first vehicle 201 sends the first request message to the reference vehicle. If there are a plurality of reference vehicles around the first vehicle 201, the first vehicle 201 sends the first request message to each of the reference vehicles. In this embodiment, an example in which there are two reference vehicles (that is, the reference vehicle 202*a* and the reference vehicle 202*b*) is used for description. A case in which there are more than two reference vehicles may be extended based on this embodiment.

The first request message includes the first positioned location information of the first vehicle 201, so that the reference vehicle provides the vehicle information of the reference vehicle for the first vehicle based on the first positioned location information of the first vehicle 201. Optionally, the first request message further includes the traveling direction of the first vehicle 201, so that the reference vehicle provides the vehicle information of the reference vehicle for the first vehicle based on the first positioned location information and the traveling direction of the first vehicle 201. The first request message may be a broadcast message. In other words, when the positioning error value of the first vehicle exceeds the first threshold and the road sign information of the third visual road sign cannot be obtained from the V2X server 203, the first vehicle sends the broadcast message to a surrounding reference vehicle. The broadcast message includes the first positioned location information of the first vehicle 201, or includes the first positioned location information and the driving direction of the first vehicle 201. The first positioned location information of the first vehicle 201 that is sent by the first vehicle 201 to the reference vehicle, or the first positioned location information and the traveling direction of the first vehicle 201 may be carried by using another message in addition to the broadcast message.

Step S106*a*: the reference vehicle 202*a* detects whether a positioning error value of the reference vehicle 202*a* exceeds the first threshold.

When receiving the first request message, the reference vehicle 202*a* detects whether the positioning error value of the reference vehicle 202*a* exceeds the first threshold. This is the same as that the first vehicle 201 detects whether the positioning error value of the first vehicle 201 exceeds the first threshold. If the positioning error value of the reference vehicle 202*a* is less than the first threshold, it may indicate that the positioning error value of the reference vehicle 202*a* is relatively small, and the reference vehicle 202*a* may be used as a visual road sign of the first vehicle 201.

If a detection result is that: the positioning error value of the reference vehicle 202*a* does not exceed the first threshold, the reference vehicle 202*a* performs step S107*a*. If the detection result is that: the positioning error value of the reference vehicle 202*a* exceeds the first threshold, the reference vehicle does not send any message to the first vehicle 201, or sends an indication message to the first vehicle 201, where the indication message is used to notify the first vehicle 201 that the reference vehicle 202*a* cannot be used as the visual road sign of the first vehicle 201*a*.

Step S106*b*: the reference vehicle 202*b* detects whether a positioning error value of the reference vehicle 202*b* exceeds the first threshold.

The step S106*b* is the same as the step S106*a*, and only an execution body is different: one is the reference vehicle 202*a* and the other is the reference vehicle 202*b*. If there is only one reference vehicle around the first vehicle 201, the step S106*b* is not performed. If there are more than two reference vehicles around the reference vehicle 201, the step S106*a* is performed on each reference vehicle.

Step S107*a*: if the detection result of the reference vehicle 202*a* is that: the positioning error value of the reference vehicle 202*a* does not exceed the first threshold, the reference vehicle 202*a* sends a first response message to the first vehicle. Correspondingly, the first vehicle receives the first response message from the reference vehicle 202*a*.

The first response message is used to respond to the first request message, the first response message includes vehicle information of the reference vehicle 202*a*, and the vehicle information of the reference vehicle 202*a* includes positioned location information of the reference vehicle 202*a*, the positioning error value of the reference vehicle 202*a*, and vehicle identifier information of the reference vehicle 202*a*. The positioned location information of the reference vehicle 202*a* may be current location information collected by the reference vehicle 202*a* when the reference vehicle 202*a* receives the first request message. The positioning error value of the reference vehicle 202*a* is a distance that has traveled by the reference vehicle 202*a* since the visual road sign used to correct the positioning error is obtained. The vehicle identifier information of the reference vehicle 202*a* may include one or more of identifiers such as a vehicle model, a vehicle color, and a license plate number.

Step S107*b*: if the detection result of the reference vehicle 202*b* is that: the positioning error value of the reference vehicle 202*b* does not exceed the first threshold, the reference vehicle 202*b* sends the first response message to the first vehicle. Correspondingly, the first vehicle receives the first response message from the reference vehicle 202*b*.

The step S107b is the same as the step S107a, and only an execution body is different: one is the reference vehicle 202a and the other is the reference vehicle 202b.

Step S108: the first vehicle 201 determines a second vehicle from the reference vehicle 202a and the reference vehicle 202b based on the positioning error value of the reference vehicle 202a and the positioning error value of the reference vehicle 202b.

The first vehicle 201 determines whether the first response message from the reference vehicle is received within a preset time period. In this embodiment, the first vehicle 201 determines whether the first response messages from the reference vehicle 202a and the reference vehicle 202b are received within the preset time period. The preset time period is not limited to a specific value in this embodiment.

If the first response messages from the reference vehicle 202a and the reference vehicle 202b are received within the preset time period, the first vehicle 201 performs step S108, and determines the second vehicle from the reference vehicle 202a and the reference vehicle 202b based on the positioning error value of the reference vehicle 202a and the positioning error value of the reference vehicle 202b. For example, the first vehicle 201 compares the positioning error value of the reference vehicle 202a with the positioning error value of the reference vehicle 202b, and determines a reference vehicle corresponding to a smaller positioning error value as the second vehicle. Further, when there are more than two reference vehicles around the first vehicle 201, the first vehicle selects, from the more than two reference vehicles based on a positioning error value of each reference vehicle, a reference vehicle with a minimum positioning error value, and determines the selected reference vehicle as the second vehicle.

In a possible implementation, the first response message further includes a collection time point of positioned location information of the reference vehicle, and the first vehicle selects, from the plurality of reference vehicles based on the positioning error value and the collection time point of the reference vehicle, a reference vehicle with a minimum positioning error value and a latest collection time point, and determines the selected reference vehicle as the second vehicle.

If only one first response message is received within the preset time period, the first vehicle 201 determines a reference vehicle that sends the first response message as the second vehicle. If the first response message is not received within the preset time period, the first vehicle 201 performs Embodiment 2 shown in FIG. 6A, FIG. 6B, and FIG. 6C.

Step S109: the first vehicle 201 adjusts the first positioned location information based on positioned location information of the second vehicle and vehicle identifier information of the second vehicle, to obtain second positioned location information.

After determining the second vehicle, the first vehicle 201 uses the second vehicle as a first visual road sign that matches the first positioned location information, uses the positioned location information of the second vehicle as positioned location information of the first visual road sign, uses the vehicle identifier information of the second vehicle as a positioning image of the first visual road sign, and adjusts the first positioned location information by using the positioned location information of the first visual road sign and the positioning image of the first visual road sign, to obtain the second positioned location information, and to correct a positioning error of the first positioned location information, so that a positioning error of the second positioned location information is relatively small. This improves positioning precision and accuracy.

In Embodiment 1 shown in FIG. 5A and FIG. 5B, when the positioning error value of the first vehicle 201 exceeds the first threshold, and the road sign information of the visual road sign used to correct the positioning error cannot be obtained from the V2X server 203, the first vehicle 201 requests to obtain the vehicle information of the reference vehicle from a plurality of surrounding reference vehicles, determines the second vehicle from the plurality of reference vehicles based on the positioning error value of the reference vehicle, and uses vehicle information of the second vehicle as the road sign information of the visual road sign to correct the positioning error of the first positioned location information, so that the positioning error of the second positioned location information is relatively small. This improves positioning precision and accuracy.

In a possible implementation, after the step S109, the method further includes the following steps.

Step S110: the first vehicle 201 collects an image of a current area in which the first vehicle 201 is located, and determines a relative location between the feature in the image and the first vehicle 201.

After obtaining the second positioned location information, the first vehicle 201 collects the image of the current area in which the first vehicle 201 is located, and determines the relative location between the feature in the image and the first vehicle 201. For example, the first vehicle 201 collects the image of the current area by using a visual sensor on the first vehicle 201, in other words, collects an image around a current vehicle. The collected image includes one or more features. The feature may be an object in the image, for example, the traffic signal light, the street lamp, or the building in FIG. 3a. The visual sensor may include, but is not limited to, a camera lens, a laser radar, a camera, and the like. Then, the first vehicle 201 determines a relative location between each feature in the image and the first vehicle 201. An algorithm for determining the relative location is not limited in this embodiment.

The feature in the image may be used as the visual road sign, and is used to correct the positioning error.

Step S111: the first vehicle 201 calculates positioned location information of the feature in the image based on the second positioned location information and the relative location.

After determining the relative location between each feature in the image and the first vehicle 201, the first vehicle 201 calculates the positioned location information of each feature in the image based on the second positioned location information and the relative location. A specific calculation method is not limited in this embodiment. For example, if a relative location between a feature and the first vehicle 201 is 10 meters in front of the first vehicle 201, the positioned location information of the feature may be 10 meters added or 10 meters subtracted based on the second positioned location information of the first vehicle 201.

Step S112: the first vehicle 201 sends the image and the positioned location information of the feature in the image to the V2X server 203.

The image and the positioned location information of the feature in the image may be carried in a unicast message and reported to the V2X server 203, or may not be carried in a message. Optionally, the first vehicle 201 further sends a collection time point of the image to the V2X server 203, so that the V2X server 203 learns of the collection time point of the image.

Step S113: the V2X server 203 generates road sign information of a second visual road sign, and adds the road sign information to the visual road sign feature library.

When receiving the image and the positioned location information of the feature in the image, the V2X server 203 generates the road sign information of the second visual road sign based on the image and the positioned location information of the feature in the image. In other words, the V2X server 203 uses the feature in the image as the second visual road sign, and uses the image of the feature and the positioned location information as the road sign information, to generate the road sign information of the second visual road sign. After generating the road sign information of the second visual road sign, the V2X server 203 adds the road sign information to the visual road sign feature library, to supplement and enrich the visual road sign feature library, so that when passing through a same location, another vehicle may directly obtain, from the V2X server 203, the visual road sign used to correct the positioning error.

In a possible implementation, after the step S109, the first vehicle 201 sends the second positioned location information of the first vehicle 201 and vehicle identifier information of the first vehicle 201 to the V2X server 203.

After correcting the first positioned location information of the first vehicle 201 to obtain the second positioned location information, the first vehicle 201 immediately reports the second positioned location information and the vehicle identifier information to the V2X server 203. When receiving the second positioned location information of the first vehicle 201 and the vehicle identifier information of the first vehicle 201, the V2X server 203 may generate the road sign information of the visual road sign based on the second positioned location information of the first vehicle 201 and the vehicle identifier information of the first vehicle 201, and add the road sign information of the visual road sign to the visual road sign feature library. In other words, the V2X server 203 uses the first vehicle as the visual road sign, so that when passing through a same location, another vehicle may directly obtain the visual road sign from the V2X server 203 to correct the positioning error.

After obtaining the second positioned location information by correcting the first positioned location information of the first vehicle 201, and after traveling for a period of time, the first vehicle 201 reports the current positioning error value, the second positioned location information, and the vehicle identifier information to the V2X server 203. When receiving the positioning error value of the first vehicle 201, the second positioned location information of the first vehicle 201, and the vehicle identifier information of the first vehicle 201, the V2X server 203 may generate the road sign information of the visual road sign based on the positioning error value of the first vehicle 201, the second positioned location information of the first vehicle 201, and the vehicle identifier information of the first vehicle 201, and add the road sign information of the visual road sign to the visual road sign feature library. In other words, the V2X server 203 uses the first vehicle as the visual road sign, so that when passing through a same location, another vehicle may directly obtain the visual road sign from the V2X server 203 to correct the positioning error.

Figure 6A:
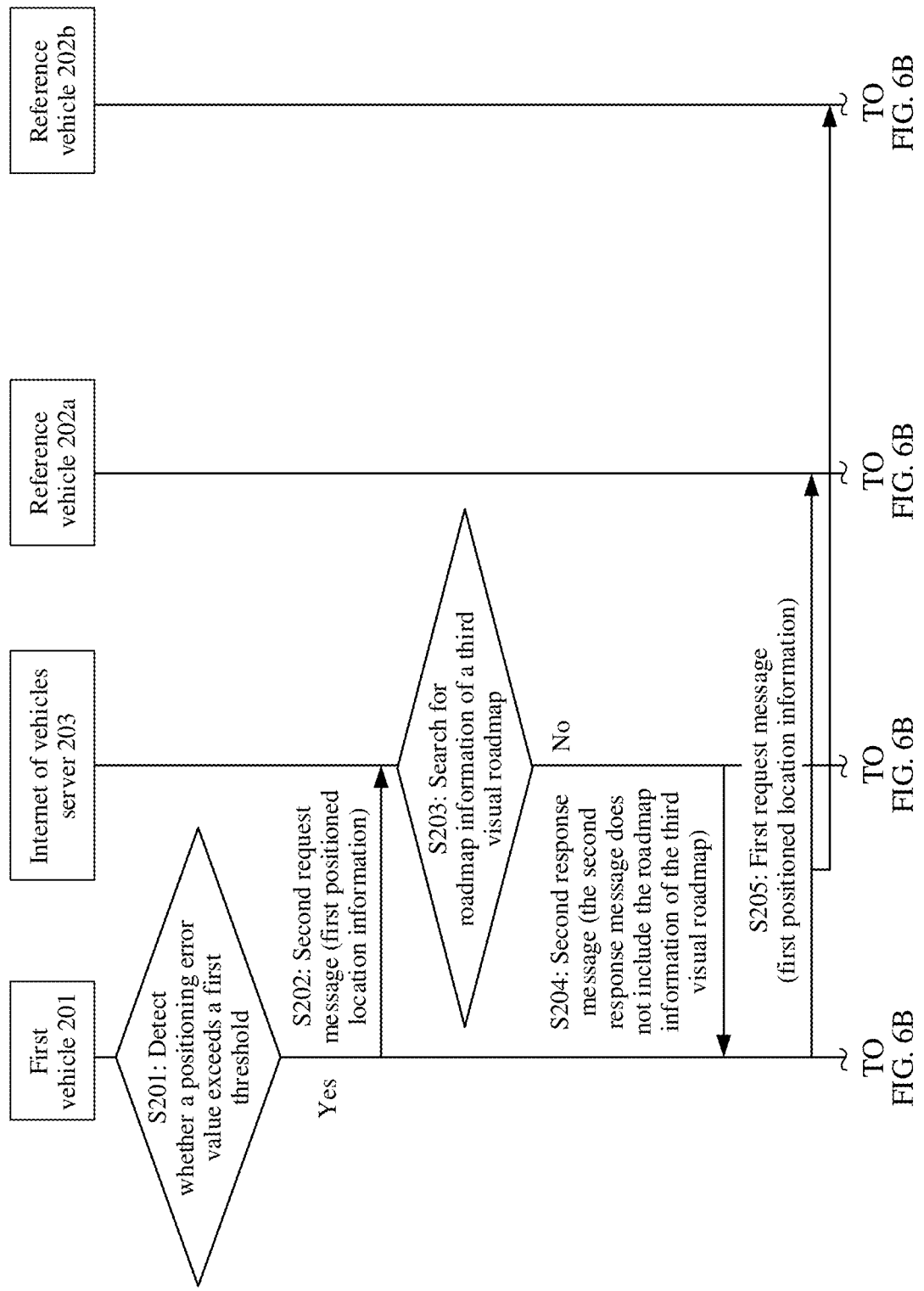
FIG. 6A is a schematic flowchart of a positioned location adjustment method according to a second embodiment.

An example in which an embodiment is applied to the schematic diagram of the network architecture shown in FIG. 2 is used. FIG. 6A, FIG. 6B, and FIG. 6C are a schematic flowchart of a positioned location adjustment method according to Embodiment 2. For descriptions of a part that is in the embodiment shown in FIG. 6A, FIG. 6B, and FIG. 6C and that is the same as those in the embodiment shown in FIG. 5A and FIG. 5B, refer to corresponding descriptions in FIG. 5A and FIG. 5B. Details are not described herein again. The embodiment shown in FIG. 6A, FIG. 6B, and FIG. 6C may include, but is not limited to, the following steps.

Step S201: a first vehicle 201 detects whether a positioning error value of the first vehicle 201 exceeds a first threshold.

Step S202: if a detection result is that: the positioning error value of the first vehicle 201 exceeds the first threshold, the first vehicle 201 sends a second request message to an V2X server 203. Correspondingly, the V2X server 203 receives the second request message from the first vehicle 201.

Step S203: the V2X server 203 searches for road sign information of a third visual road sign.

Step S204: if there is no road sign information of the third visual road sign, the V2X server 203 sends a second response message to the first vehicle 201, where the second response message does not include the road sign information of the third visual road sign. Correspondingly, the first vehicle 201 receives the second response message from the V2X server 203.

Step S205: the first vehicle 201 sends a first request message to a reference vehicle 202*a* and a reference vehicle 202*b*. Correspondingly, the reference vehicle 202*a* receives the first request message from the first vehicle 201, and the reference vehicle 202*b* receives the first request message from the first vehicle 201.

Step S206*a*: the reference vehicle 202*a* detects whether a positioning error value of the reference vehicle 202*a* exceeds the first threshold.

Step S206*b*: the reference vehicle 202*b* detects whether a positioning error value of the reference vehicle 202*b* exceeds the first threshold.

When detecting that the positioning error value of the reference vehicle exceeds the first threshold, the reference vehicle may not send a first response message to the first vehicle 201; or send an indication message to the first vehicle 201, where the indication message is used to indicate that the reference vehicle cannot be used as a visual road sign; or send a first response message to the first vehicle 201, where the first response message does not include vehicle information of the reference vehicle.

Step S207: the first vehicle 201 sends a third request message to the V2X server 203 when the first response message is not received. Correspondingly, the V2X server 203 receives the third request message from the first vehicle 201.

When none of the first response messages is received, or when none of the received first response messages includes the vehicle information of the reference vehicle, or when the indication message is received, in other words, when none of the vehicle information of any reference vehicle is obtained, the first vehicle 201 sends the third request message to the V2X server 203.

The third request message is used to request the V2X server 203 to search for a reference vehicle that meets a preset condition, where the preset condition is that: a positioning error value is less than the first threshold and is within a preset range of the first vehicle. A specific value of the preset range is not limited in this embodiment.

Step S208: the V2X server 203 searches for the reference vehicle that meets the preset condition.

When receiving the third request message, the V2X server 203 searches, based on first positioned location information of the first vehicle 201 or based on first positioned location information and a driving direction of the first vehicle 201, for the reference vehicle whose positioning error value is less than the first threshold and is within the preset range of the first vehicle 201. The V2X server 203 may search a current visual road sign feature library for the reference vehicle, or may send a request message to a vehicle around the first vehicle 201, where the request message is used to request vehicle information of the vehicle. If a positioning error value fed back by the vehicle to the V2X server 203 is less than the first threshold, the vehicle may be used as the reference vehicle.

Step S209: If there is no reference vehicle, the V2X server 203 sends a third response message to the first vehicle 201, where the third response message does not include the vehicle information of the reference vehicle. Correspondingly, the first vehicle 201 receives the third response message from the V2X server 203.

If the V2X server 203 does not find the reference vehicle, the third response message sent by the V2X server 203 to the first vehicle 201 does not include the vehicle information of the reference vehicle. Alternatively, the V2X server 203 sends an indication message to the first vehicle 201, where the indication message is used to indicate that the reference vehicle is not found.

Step S210: when the positioning error value of the first vehicle 201 exceeds a second threshold, the first vehicle 201 is restricted to use visual positioning.

When the first vehicle 201 does not obtain the vehicle information of the reference vehicle, for example, when the third response message does not include the vehicle information of the reference vehicle, the first vehicle 201 continues to detect the positioning error value of the first vehicle 201. If the positioning error value of the first vehicle 201 exceeds the second threshold, the first vehicle 201 is restricted to continue to use visual positioning, in other words, the first vehicle 201 is restricted to depend on a high-precision positioning service. For example, in FIG. 4, when the positioning error value of the vehicle A exceeds the second threshold 100 meters, the vehicle A is restricted from continuing to use visual positioning.

It may be understood that, when the positioning error value of the vehicle during driving is greater than the second threshold, and no visual road sign used to correct the positioning error is obtained, the vehicle is restricted to depend on the high-precision positioning service, to avoid continuous accumulation of the positioning error value, which may severely affect positioning precision and accuracy.

Step S211: if there is the reference vehicle, the V2X server 203 sends a third response message to the first vehicle 201, where the third response message includes the vehicle information of the reference vehicle. Correspondingly, the first vehicle 201 receives the third response message from the V2X server 203.

If the V2X server 203 finds the reference vehicle, the V2X server 203 extracts the vehicle information of the reference vehicle, and sends the third response message to the first vehicle 201, where the third response message includes the vehicle information of the reference vehicle. If the V2X server 203 finds one reference vehicle, the third response message includes the vehicle information of the reference vehicle. Alternatively, if the V2X server 203 finds a plurality of reference vehicles, the third response message includes vehicle information of each of the plurality of reference vehicles.

The vehicle information of the reference vehicle includes positioned location information of the reference vehicle, a positioning error value of the reference vehicle, and vehicle identifier information of the reference vehicle.

Step S212: the first vehicle 201 determines a third vehicle, and adjusts the first positioned location information based on positioned location information of the third vehicle and vehicle identifier information of the third vehicle, to obtain second positioned location information.

The first vehicle 201 determines the third vehicle based on the third response message. For example, if the third response message includes the vehicle information of the reference vehicle, the first vehicle 201 determines the reference vehicle as the third vehicle. If the third response message includes the vehicle information of each of the plurality of reference vehicles, the first vehicle 201 selects a reference vehicle with a minimum positioning error value from the plurality of reference vehicles based on the positioning error value of the reference vehicle, and determines the reference vehicle as the third vehicle.

The first vehicle 201 uses the third vehicle as the visual road sign used to correct the positioning error, uses positioned location information of the third vehicle as positioned location information of the visual road sign, uses vehicle identifier information of the third vehicle as a positioning image of the visual road sign, and adjusts the first positioned location information by using the positioned location information and the positioning image of the visual road sign, to obtain the second positioned location information.

In Embodiment 2 shown in FIG. 6A, FIG. 6B, and FIG. 6C, when the positioning error value of the first vehicle 201 exceeds the first threshold, and the road sign information of the visual road sign used to correct the positioning error cannot be obtained from the V2X server 203, the first vehicle 201 requests to obtain the vehicle information of the reference vehicle from the plurality of surrounding reference vehicles, and when the vehicle information of the reference vehicle is not received, requests the V2X server 203 to search for the reference vehicle around the first vehicle 201, so that the first vehicle corrects the positioning error of the first positioned location information based on the vehicle information of the reference vehicle, and the positioning error of the second positioned location information is relatively small. This improves positioning precision and accuracy.

Similarly, after the step S212, the steps S110 to the S113 shown in FIG. 5B may be further performed, or the first vehicle 201 may further send the second positioned location information of the first vehicle 201 and vehicle identifier information of the first vehicle 201 to the V2X server 203.

Figure 7:
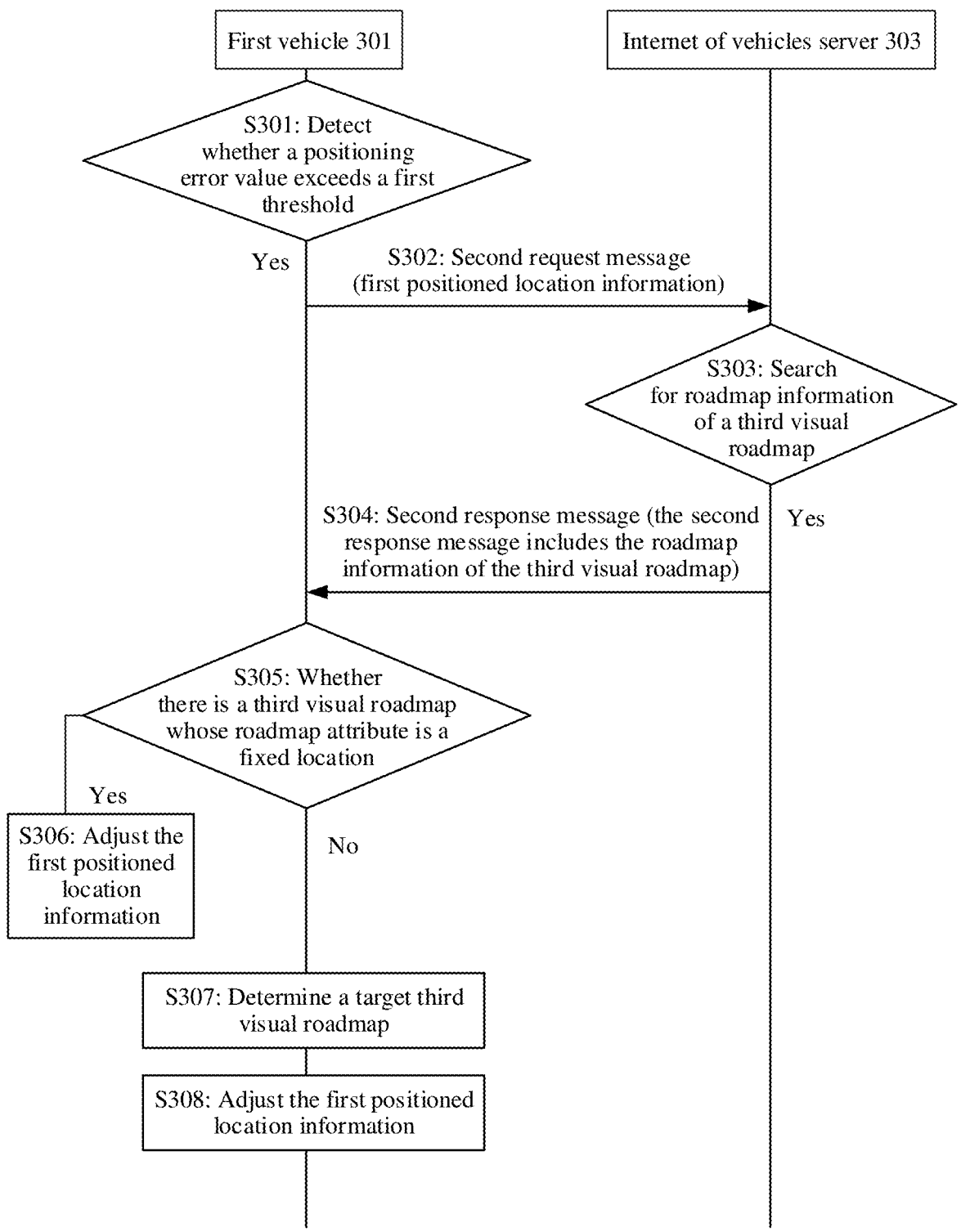
FIG. 7 is a schematic flowchart of a positioned location adjustment method according to a third embodiment.

An example in which an embodiment is applied to the schematic diagram of the network architecture shown in FIG. 2 is used. FIG. 7 is a schematic flowchart of a positioned location adjustment method according to Embodiment 3. For descriptions of a part that is in the embodiment shown in FIG. 7 and that is the same as those in the embodiment shown in FIG. 5A and FIG. 5B, refer to corresponding descriptions in FIG. 5A and FIG. 5B. Details are not described herein again. The embodiment shown in FIG. 7 may include, but is not limited to, the following steps.

Step S301: a first vehicle 201 detects whether a positioning error value of the first vehicle 201 exceeds a first threshold.

Step S302: if a detection result is that: the positioning error value of the first vehicle 201 exceeds the first threshold, the first vehicle 201 sends a second request message to an V2X server 203. Correspondingly, the V2X server 203 receives the second request message from the first vehicle 201.

Step S303: the V2X server 203 searches for road sign information of a third visual road sign.

Step S304: if there is road sign information of a plurality of third visual road signs, the V2X server 203 sends a second response message to the first vehicle 201, where the second response message includes the road sign information of the plurality of third visual road signs. Correspondingly, the first vehicle 201 receives the second response message from the V2X server 203.

The road sign information of the third visual road sign includes a positioning image of the third visual road sign, positioned location information of the third visual road sign, and a road sign attribute of the third visual road sign, and the road sign attribute may be a fixed location or reported by a vehicle.

Step S305: the first vehicle 201 determines whether there is a third visual road sign whose road sign attribute is the fixed location.

The first vehicle 201 determines whether there is the third visual road sign whose road sign attribute is the fixed location in the plurality of third visual road signs.

Step S306: if there is the third visual road sign whose road sign attribute is the fixed location in the plurality of third visual road signs, the first vehicle 201 adjusts first positioned location information based on the road sign information of the third visual road sign, to obtain second positioned location information.

If there is one third visual road sign whose road sign attribute is the fixed position, the first vehicle 201 adjusts the first positioned location information based on the positioned location information of the third visual road sign and the positioning image of the third visual road sign, to obtain the second positioned location information.

If there are a plurality of third visual road signs whose road sign attributes are fixed locations, the first vehicle 201 adjusts the first positioned location information based on the positioned location information and the positioning image of each third visual road sign, to obtain the second positioned location information.

After obtaining the second positioned location information, the first vehicle 201 may send an indication message to the V2X server 203, where the indication message is used to indicate that the first vehicle 201 successfully matches the third visual road sign.

Step S307: if there is no third visual road sign whose road sign attribute is the fixed location in the plurality of third visual road signs, the first vehicle 201 determines a target third visual road sign based on a positioning error value of the third visual road sign.

If there is no third visual road sign whose road sign attribute is the fixed location, it indicates that visual road signs that match a first positioned location information each are a third visual road sign reported by a vehicle. In this case, the vehicle is used as the third visual road sign, or a feature in an image reported by the vehicle is used as the third visual road sign.

In a possible implementation, the road sign information of the third visual road sign further includes the positioning error value of the third visual road sign, and the first vehicle 201 selects, from the plurality of third visual road signs based on the positioning error value of each third visual road sign, a third visual road sign with a minimum positioning error value, and determines the third visual road sign as the target third visual road sign.

In a possible implementation, the road sign information of the third visual road sign further includes the positioning error value of the third visual road sign and a timestamp of the third visual road sign, and the timestamp of the third visual road sign may be a time value of generating the third visual road sign by the V2X server 203, or may be a time value of receiving the third visual road sign by the V2X server 203, or may be a time value added by the vehicle when the vehicle reports vehicle information of the vehicle. The first vehicle 201 selects, from the plurality of third visual road signs based on the positioning error value and the timestamp of each third visual road sign, a third visual road sign with a minimum positioning error value and a latest timestamp, and determines the third visual road sign as the target third visual road sign.

Step S308: the first vehicle 201 adjusts the first positioned location information based on road sign information of the target third visual road sign, to obtain second positioned location information.

After determining the target third visual road sign, the first vehicle 201 adjusts the first positioned location information based on positioned location information of the target third visual road sign and a positioning image of the target third visual road sign, to obtain the second positioned location information.

After obtaining the second positioned location information, the first vehicle 201 may send an indication message to the V2X server 203, where the indication message is used to indicate that the first vehicle 201 successfully matches the third visual road sign.

In Embodiment 3 shown in FIG. 7, a problem of how to select, when the first vehicle 201 obtains the road sign information of the plurality of third visual road signs from the V2X server 203, the third visual road sign used to correct the positioning error is resolved. A most appropriate third visual road sign is selected by determining a road sign attribute, to correct the first positioned location information, to further improve positioning precision and accuracy.

The foregoing describes in detail the method in the embodiments. The following provides apparatuses in the embodiments.

Figure 8:
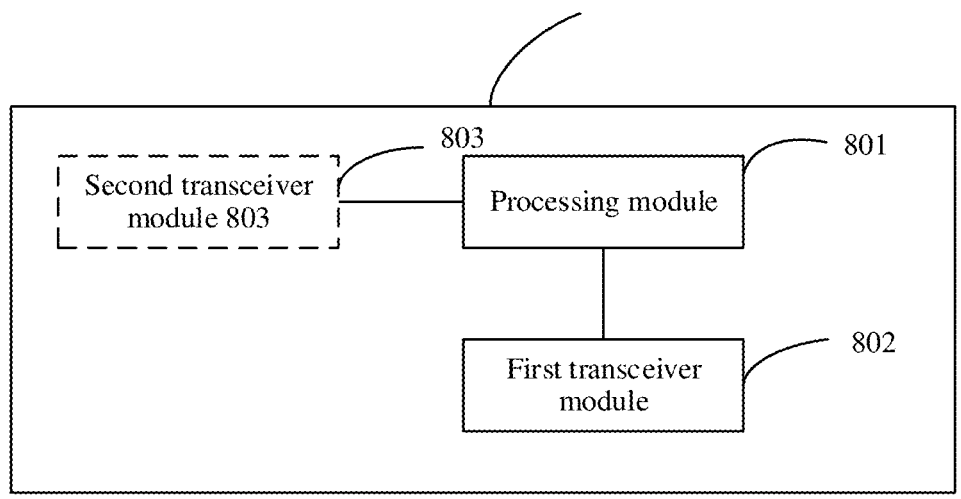
FIG. 8 is a schematic diagram of a logical structure of a positioned location adjustment apparatus according to an embodiment.

FIG. 8 is a schematic diagram of a logical structure of a positioned location adjustment apparatus according to an embodiment. The positioned location adjustment apparatus 80 may be a first vehicle, or may be a reference vehicle.

When the positioned location adjustment apparatus 80 is the first vehicle, the positioned location adjustment apparatus 80 includes:

a first transceiver module 802, configured to: send a first request message to a plurality of reference vehicles, where the first request message is used to request vehicle information of the reference vehicle, the first request message includes first positioned location information, and the first positioned location information is current location information of the first vehicle; and receive a first response message from the reference vehicle, where the first response message includes the vehicle information of the reference vehicle, and the vehicle information of the reference vehicle includes positioned location information of the reference vehicle, a positioning error value of the reference vehicle, and vehicle identifier information of the reference vehicle; and a processing module 801, configured to: determine a second vehicle from the plurality of reference vehicles based on the positioning error value of the reference vehicle, and adjust the first positioned location information based on positioned location information of the second vehicle and vehicle identifier information of the second vehicle, to obtain second positioned location information.

In a possible implementation, when the processing module 801 is configured to determine the second vehicle from the plurality of reference vehicles based on the positioning error value of the reference vehicle, the processing module 801 is configured to: select a reference vehicle with a minimum positioning error value from the plurality of reference vehicles based on the positioning error value of the reference vehicle, and determines the selected reference vehicle as the second vehicle.

In a possible implementation, the processing module 801 is configured to adjust the first positioned location information based on the positioned location information of the second vehicle and the vehicle identifier information of the second vehicle, and is configured to: use the second vehicle as a first visual road sign that matches the first positioned location information, use the positioned location information of the second vehicle as positioned location information of the first visual road sign, use the vehicle identifier information of the second vehicle as a positioning image of the first visual road sign, and adjust the first positioned location information by using the positioned location information of the first visual road sign and the positioning image of the first visual road sign.

In a possible implementation, the positioned location adjustment apparatus 80 further includes a second transceiver module 803.

The processing module 801 is further configured to: collect an image of a current area in which the first vehicle is located, determine a relative location between a feature in the image and the first vehicle, and calculate positioned location information of the feature in the image based on the second positioned location information and the relative location.

The second transceiver module 803 is configured to send the image and the positioned location information of the feature in the image to an V2X server, where the image and the positioned location information of the feature in the image are used by the V2X server to generate road sign information of a second visual road sign, and add the road sign information of the second visual road sign to a visual road sign feature library; and the second visual road sign is the feature in the image.

In a possible implementation, the positioned location adjustment apparatus 80 further includes a second transceiver module 803.

The processing module 801 is further configured to: collect an image of a current area in which the first vehicle is located, and determine a relative location between a feature in the image and the first vehicle; and calculate positioned location information of the feature in the image based on the second positioned location information and the relative location.

The second transceiver module 803 is configured to send the image and the positioned location information of the feature in the image to an V2X server, where the image and the positioned location information of the feature in the image are used by the V2X server to generate road sign information of a second visual road sign, and add the road sign information of the second visual road sign to a visual road sign feature library; and the second visual road sign is the feature in the image.

In a possible implementation, the positioned location adjustment apparatus 80 further includes a second transceiver module 803.

The second transceiver module 803 is configured to: when a positioning error value of the first vehicle exceeds a first threshold, send a second request message to an V2X server, where the second request message includes the first positioned location information, the second request message is used to request the V2X server to search for road sign information of a third visual road sign that matches the first positioned location information, and the third visual road sign is a visual road sign that matches the first positioned location information and that is stored in a visual road sign feature library; and receive a second response message from the V2X server.

If the second response message does not include the road sign information of the third visual road sign, the first transceiver module 802 sends the first request message to the plurality of reference vehicles.

In a possible implementation, the positioned location adjustment apparatus 80 further includes a second transceiver module 803.

The second transceiver module 803 is configured to: when a positioning error value of the first vehicle exceeds a first threshold, send a second request message to an V2X server, where the second request message includes the first positioned location information, the second request message is used to request the V2X server to search for road sign information of a third visual road sign that matches the first positioned location information, the road sign information of the third visual road sign includes a positioning image of the third visual road sign, positioned location information of the third visual road sign, and a road sign attribute of the third visual road sign, and the road sign attribute is a fixed location or reported by a vehicle; and receive a second response message from the V2X server.

If the second response message includes the road sign information of the plurality of third visual road signs, the processing module 801 is further configured to determine whether there is a third visual road sign whose road sign attribute is the fixed location in the plurality of third visual road signs.

If there is the third visual road sign whose road sign attribute is the fixed position, the processing module 801 is further configured to adjust the first positioned location information based on the positioning image of the third visual road sign and the positioned location information of the third visual road sign, to obtain the second positioned location information.

In a possible implementation, the road sign information of the third visual road sign further includes a positioning error value of the third visual road sign.

If there is no third visual road sign whose road sign attribute is the fixed position, the processing module 801 is further configured to: select a third visual road sign with a minimum positioning error value from the plurality of third visual road signs based on the positioning error value of the third visual road sign, determine the third visual road sign as a target third visual road sign, and adjust the first positioned location information based on a positioning image of the target third visual road sign and positioned location information of the target third visual road sign, to obtain the second positioned location information.

In a possible implementation, the road sign information of the third visual road sign further includes a positioning error value of the third visual road sign and a timestamp of the third visual road sign.

If there is no third visual road sign whose road sign attribute is the fixed position, the processing module 801 is further configured to: select a third visual road sign with a minimum positioning error value and a latest timestamp from the plurality of third visual road signs based on the positioning error value of the third visual road sign and the timestamp of the third visual road sign, determine the third visual road sign as a target third visual road sign, and adjust the first positioned location information based on a positioning image of the target third visual road sign and positioned location information of the target third visual road sign, to obtain the second positioned location information.

In a possible implementation, the positioned location adjustment apparatus 80 further includes a second transceiver module 803.

If the first transceiver module 802 does not receive the first response message, the second transceiver module 803 is configured to send a third request message to an V2X server, where the third request message is used to request the V2X server to search for a reference vehicle that meets a preset condition, the preset condition is that: a positioning error value is less than a first threshold and is within a preset range of the first vehicle; and receive a third response message from the V2X server.

If the third response message does not include the vehicle information of the reference vehicle, the processing module 801 is further configured to: when a positioning error value of the first vehicle exceeds a second threshold, restrict the first vehicle from using visual positioning, where the vehicle information of the reference vehicle includes the positioned location information of the reference vehicle, the positioning error value of the reference vehicle, and the vehicle identifier information of the reference vehicle.

If the third response message includes vehicle information of a plurality of reference vehicles, the processing module 801 is further configured to: determine a third vehicle from the plurality of reference vehicles based on the positioning error value of the reference vehicle, and adjust the first positioned location information based on positioned location information of the third vehicle and vehicle identifier information of the third vehicle, to obtain the second positioned location information.

In a possible implementation, the first request message further includes a traveling direction of the first vehicle, the second request message further includes the traveling direction of the first vehicle, and the third request message further includes the traveling direction of the first vehicle.

When the positioned location adjustment apparatus 80 is the first vehicle, the first transceiver module 802 is configured to: perform step S105, step S107a, and step S107b in the embodiment shown in FIG. 5A and FIG. 5B, and perform step S205 in the embodiment shown in FIG. 6A. The second transceiver module 803 is configured to: perform step S102 and step S104 in the embodiment shown in FIG. 5A, perform step S202, step S204, step S207, step S209, and step S211 in the embodiment shown in FIG. 6A, FIG. 6B, and FIG. 6C, and perform S302 and step S304 in the embodiment shown in FIG. 7. It may be understood that the first transceiver module 802 is configured to communicate with the reference vehicle, and the second transceiver module 803 is configured to communicate with the V2X server. The processing module 801 is configured to perform step S101, step S108, and step S109 in the embodiment shown in FIG. 4.

When the positioned location adjustment apparatus 80 is the reference vehicle, the positioned location adjustment apparatus 80 includes:

a first transceiver module 802, configured to receive a first request message from a first vehicle, where the first request message includes first positioned location information of the first vehicle; and a processing module 801, configured to: when it is detected that a positioning error value of the reference vehicle is less than a first threshold, extract positioned location information of the reference vehicle and vehicle identifier information of the reference vehicle.

The first transceiver module 802 is further configured to send a first response message to the first vehicle, where the first response message includes vehicle information of the reference vehicle, and the vehicle information of the reference vehicle includes the positioned location information of the reference vehicle, the positioning error value of the reference vehicle, and the vehicle identifier information of the reference vehicle.

When the positioned location adjustment apparatus 80 is the reference vehicle, the first transceiver module 802 is configured to communicate with the first vehicle, for example, perform step S105, step S106a, and step S107a in the embodiment shown in FIG. 5A and FIG. 5B, and perform step S205 in the embodiment shown in FIG. 6A. The processing module 801 is configured to perform step S106a in the embodiment shown in FIG. 5B, and perform step S206a in the embodiment shown in FIG. 6B.

Figure 9:
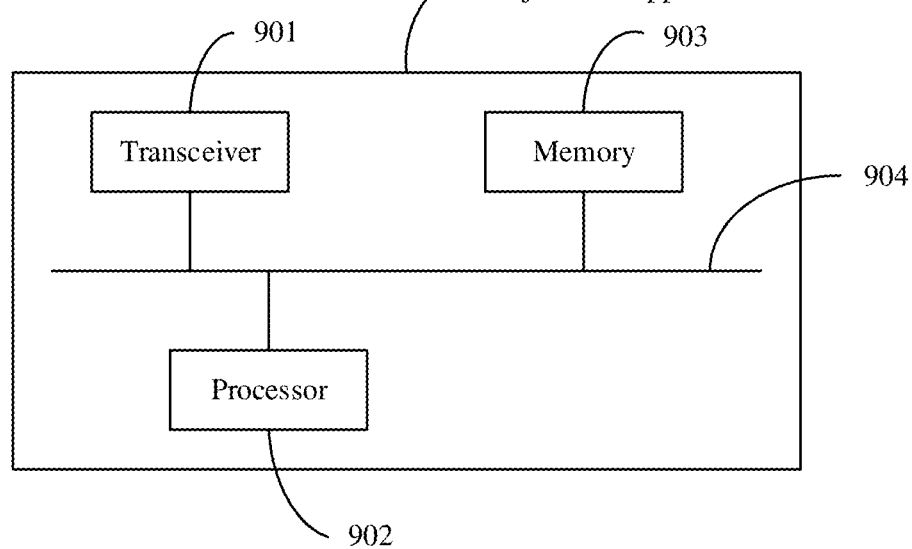
FIG. 9 is a simplified schematic diagram of an entity structure of a positioned location adjustment apparatus according to an embodiment.

FIG. 9 is a simplified schematic diagram of an entity structure of a positioned location adjustment apparatus according to an embodiment. The positioned location adjustment apparatus may be a first vehicle or a reference vehicle. The positioned location adjustment apparatus 90 includes a transceiver 901, a processor 902, and a memory 903. The transceiver 901, the processor 902, and the memory 903 may be connected to each other by using a bus 904, or may be connected to each other in another manner. A related function implemented by the processing module 801 shown in FIG. 8 may be implemented by using one or more processors 902. Related functions implemented by the first transceiver module 802 and the second transceiver module 803 shown in FIG. 8 may be implemented by using the transceiver 901.

The memory 903 includes, but is not limited to, a random access memory (RAM), a read-only memory (ROM), an erasable programmable read-only memory (EPROM), or a compact disc read-only memory (CD-ROM). The memory 903 is configured to store a related instruction and related data.

The transceiver 901 is configured to send data and/or signaling, and receive data and/or signaling.

In this embodiment, when the positioned location adjustment apparatus 90 is the first vehicle, in view of communication with different devices, the transceiver 901 may be classified into a transceiver 9011 communicating with the reference vehicle and a transceiver 9012 communicating with an V2X server. The transceiver 9011 is configured to: perform step S105, step S107a, and step S107b in the embodiment shown in FIG. 5A and FIG. 5B, and perform step S205 in the embodiment shown in FIG. 6A. The transceiver 9012 is configured to: perform step S102 and step S104 in the embodiment shown in FIG. 5A, perform step S202, step S204, step S207, step S209, and step S211 in the embodiment shown in FIG. 6A, FIG. 6B, and FIG. 6C, and perform S302 and step S304 in the embodiment shown in FIG. 7.

In this embodiment, when the positioned location adjustment apparatus 90 is the reference vehicle, the transceiver 901 is configured to: perform step S105, step S106a, and step S107a in the embodiment shown in FIG. 5A and FIG. 5B, and perform step S205 in the embodiment shown in FIG. 6A. The reference vehicle may also communicate with the V2X server.

The processor 902 may include one or more processors, for example, include one or more central processing units (CPU). When the processor 902 is one CPU, the CPU may be a single-core CPU or a multi-core CPU.

In this embodiment, when the positioned location adjustment apparatus 90 is the first vehicle, the processor 902 is configured to perform step S101, step S108, and step S109 in the embodiment shown in FIG. 4.

In this embodiment, when the positioned location adjustment apparatus 90 is the first vehicle, the processor 902 is configured to perform step S106a in the embodiment shown in FIG. 5B, and perform step S206a in the embodiment shown in FIG. 6B.

The memory 903 is configured to store program code and data of the positioned location adjustment apparatus 90.

For the steps performed by the processor 902 and the transceiver 901, refer to descriptions of the embodiments shown in FIG. 5A to FIG. 7. Details are not described herein again.

It may be understood that FIG. 9 shows only a simplified design of the positioned location adjustment apparatus. In actual application, the positioned location adjustment apparatus may further include other necessary elements, including, but not limited to, any quantity of transceivers, processors, controllers, memories, communications units, and the like. All devices that can implement this application fall within the scope of the embodiments.

An embodiment further provides a positioned location adjustment system, including a first vehicle and a reference vehicle, and further including an V2X server. For the functions implemented by the V2X server, refer to descriptions of the V2X server in the embodiments shown in FIG. 5A to FIG. 7.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium includes: any medium that can store program code, such as a ROM, a RAM, a magnetic disk, or an optical disc. Therefore, another embodiment provides a computer-readable storage medium. The computer-readable storage medium stores an instruction, and when the instruction is run on a computer, the computer is enabled to perform the methods in the foregoing aspects.

Another embodiment further provides a computer program product including an instruction, and when the computer program product runs on a computer, the computer is enabled to perform the methods in the foregoing aspects.

A person of ordinary skill in the art may understand that, in combination with the examples described in the embodiments, units and algorithm steps may be implemented by electronic hardware or a combination of computer software and electronic hardware. Whether the functions are performed by hardware or software depends on particular applications and design constraint conditions of the solutions. A person of ordinary skill in the art may use different methods to implement the described functions for each embodiment, but it should not be considered that the implementation goes beyond the scope of the embodiments.

It may be understood by a person of ordinary skill in the art that, for the purpose of convenient and brief description, for a detailed working process of the foregoing system, apparatus, and unit, refer to a corresponding process in the foregoing method embodiments. Details are not described herein again.

In a plurality of embodiments, it may be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments are all or partially generated. The computer may be a general-purpose computer, a dedicated computer, a computer network, or other programmable apparatuses. The computer instruction may be stored in a computer readable storage medium, or may be transmitted by using the computer readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A positioned location adjustment method, comprising:
 sending, by a first vehicle, a first request message to a plurality of reference vehicles, wherein the first request message is used to request vehicle information of the reference vehicle, the first request message comprises first positioned location information, and the first positioned location information is current location information of the first vehicle;
 receiving, by the first vehicle, a first response message from the reference vehicle, wherein the first response message comprises the vehicle information of the reference vehicle, and the vehicle information of the reference vehicle comprises positioned location information of the reference vehicle, a positioning error value of the reference vehicle, and vehicle identifier information of the reference vehicle;

determining, by the first vehicle, a second vehicle from the plurality of reference vehicles based on the positioning error value of the reference vehicle; and adjusting, by the first vehicle, the first positioned location information based on positioned location information of the second vehicle and vehicle identifier information of the second vehicle, to obtain second positioned location information.

2. The method according to claim 1, wherein the determining, by the first vehicle, of the second vehicle from the plurality of reference vehicles based on the positioning error value of the reference vehicle comprises:

selecting, by the first vehicle, a reference vehicle with a minimum positioning error value from the plurality of reference vehicles based on the positioning error value of the reference vehicle, and determining the selected reference vehicle as the second vehicle.

3. The method according to claim 1, wherein the adjusting, by the first vehicle, of the first positioned location information based on positioned location information of the second vehicle and vehicle identifier information of the second vehicle comprises:

using, by the first vehicle, the second vehicle as a first visual road sign that matches the first positioned location information, using the positioned location information of the second vehicle as positioned location information of the first visual road sign, and using the vehicle identifier information of the second vehicle as a positioning image of the first visual road sign; and adjusting, by the first vehicle, the first positioned location information by using the positioned location information of the first visual road sign and the positioning image of the first visual road sign.

4. The method according to claim 1, further comprising:

collecting, by the first vehicle, an image of a current area in which the first vehicle is located, and determining a relative location between a feature in the image and the first vehicle;

calculating, by the first vehicle, positioned location information of the feature in the image based on the second positioned location information and the relative location; and sending, by the first vehicle, the image and the positioned location information of the feature in the image to an vehicle to everything server, wherein the image and the positioned location information of the feature in the image are used by the vehicle to everything server to generate road sign information of a second visual road sign, and add the road sign information of the second visual road sign to a visual road sign feature library; and the second visual road sign is the feature in the image.

5. The method according to claim 1, wherein before the sending, by a first vehicle, of the first request message to a plurality of reference vehicles, the method further comprises:

when a positioning error value of the first vehicle exceeds a first threshold, sending, by the first vehicle, a second request message to an vehicle to everything server, wherein the second request message comprises the first positioned location information, the second request message is used to request the vehicle to everything server to search for road sign information of a third visual road sign that matches the first positioned location information, and the third visual road sign is a visual road sign that matches the first positioned location information and that is stored in a visual road sign feature library;

receiving, by the first vehicle, a second response message from the vehicle to everything server; and if the second response message does not comprise the road sign information of the third visual road sign, sending, by the first vehicle, the first request message to the plurality of reference vehicles.

6. The method according to claim 5, wherein the first request message further comprises a traveling direction of the first vehicle, the second request message further comprises the traveling direction of the first vehicle, and the third request message further comprises the traveling direction of the first vehicle.

7. The method according to claim 1, further comprising:

when a positioning error value of the first vehicle exceeds a first threshold, sending, by the first vehicle, a second request message to an vehicle to everything server, wherein the second request message comprises the first positioned location information, the second request message is used to request the vehicle to everything server to search for road sign information of a third visual road sign that matches the first positioned location information, the road sign information of the third visual road sign comprises a positioning image of the third visual road sign, positioned location information of the third visual road sign, and a road sign attribute of the third visual road sign, and the road sign attribute is a fixed location or reported by a vehicle;

receiving, by the first vehicle, a second response message from the vehicle to everything server;

if the second response message comprises road sign information of a plurality of third visual road signs, determining, by the first vehicle, whether there is a third visual road sign whose road sign attribute is the fixed location in the plurality of third visual road signs; and if there is the third visual road sign whose road sign attribute is the fixed position, adjusting, by the first vehicle, the first positioned location information based on the positioning image of the third visual road sign and the positioned location information of the third visual road sign, to obtain the second positioned location information.

8. The method according to claim 7, wherein the road sign information of the third visual road sign further comprises a positioning error value of the third visual road sign; and the method further comprises:

if there is no third visual road sign whose road sign attribute is the fixed position, selecting, by the first vehicle, a third visual road sign with a minimum positioning error value from the plurality of third visual road signs based on the positioning error value of the third visual road sign, and determining the third visual road sign as a target third visual road sign; and adjusting, by the first vehicle, the first positioned location information based on a positioning image of the target third visual road sign and positioned location information of the target third visual road sign, to obtain the second positioned location information.

9. The method according to claim 7, wherein the road sign information of the third visual road sign further comprises a positioning error value of the third visual road sign and a timestamp of the third visual road sign; and the method further comprises:

if there is no third visual road sign whose road sign attribute is the fixed position, selecting, by the first vehicle, a third visual road sign with a minimum positioning error value and a latest timestamp from the plurality of third visual road signs based on the positioning error value of the third visual road sign and the timestamp of the third visual road sign, and determining the third visual road sign as a target third visual road sign; and adjusting, by the first vehicle, the first positioned location information based on a positioning image of the target third visual road sign and positioned location information of the target third visual road sign, to obtain the second positioned location information.

10. The method according to claim 1, wherein the method further comprises:
if the first vehicle does not receive the first response message, sending, by the first vehicle, a third request message to a vehicle to everything server, wherein the third request message is used to request the vehicle to everything server to search for a reference vehicle that meets a preset condition, and the preset condition is: a positioning error value is less than a first threshold and is within a preset range of the first vehicle;
receiving, by the first vehicle, a third response message from the vehicle to everything server; and
if the third response message does not comprise vehicle information of the reference vehicle, restricting, by the first vehicle when a positioning error value of the first vehicle exceeds a second threshold, the first vehicle from using visual positioning, wherein the vehicle information of the reference vehicle comprises positioned location information of the reference vehicle, a positioning error value of the reference vehicle, and vehicle identifier information of the reference vehicle; or
if the third response message comprises vehicle information of a plurality of reference vehicles, determining, by the first vehicle, a third vehicle from the plurality of reference vehicles based on the positioning error value of the reference vehicle, and adjusting the first positioned location information based on positioned location information of the third vehicle and vehicle identifier information of the third vehicle, to obtain the second positioned location information.

11. A visual positioning adjustment method, comprising:
receiving, by a reference vehicle, a first request message from a first vehicle, wherein the first request message comprises first positioned location information of the first vehicle;
when detecting that a positioning error value of the reference vehicle is less than a first threshold, extracting, by the reference vehicle, positioned location information of the reference vehicle and vehicle identifier information of the reference vehicle; and
sending, by the reference vehicle, a first response message to the first vehicle, wherein the first response message comprises vehicle information of the reference vehicle, and the vehicle information of the reference vehicle comprises the positioned location information of the reference vehicle, the positioning error value of the reference vehicle, and the vehicle identifier information of the reference vehicle.

12. The method according to claim 11, wherein the first request message further comprises a traveling direction of the first vehicle.

13. A positioned location adjustment apparatus, comprising:
a transceiver configured to communicate with an apparatus other than the positioned location adjustment apparatus;
a memory configured to store a computer executable instruction; and
one or more processors connected to the memory and the transceiver through a bus, wherein when the computer executable instruction stored in the memory is executed by the processors cause the positioned location adjustment apparatus to be configured to perform the following method:
sending a first request message to a plurality of reference vehicles, wherein the first request message is used to request vehicle information of the reference vehicle, the first request message comprises first positioned location information, and the first positioned location information is current location information of the positioned location adjustment apparatus;
receiving a first response message from the reference vehicle, wherein the first response message comprises the vehicle information of the reference vehicle, and the vehicle information of the reference vehicle comprises positioned location information of the reference vehicle, a positioning error value of the reference vehicle, and vehicle identifier information of the reference vehicle;
determining a second vehicle from the plurality of reference vehicles based on the positioning error value of the reference vehicle; and
adjusting, the first positioned location information based on positioned location information of the second vehicle and vehicle identifier information of the second vehicle, to obtain second positioned location information.

14. The positioned location adjustment apparatus according to claim 13, wherein the positioned location adjustment apparatus is further configured to:
select a reference vehicle with a minimum positioning error value from the plurality of reference vehicles based on the positioning error value of the reference vehicle, and determine the selected reference vehicle as the second vehicle.

15. The positioned location adjustment apparatus according to claim 13, wherein the positioned location adjustment apparatus is further configured to:
use the second vehicle as a first visual road sign that matches the first positioned location information, use the positioned location information of the second vehicle as positioned location information of the first visual road sign, and use the vehicle identifier information of the second vehicle as a positioning image of the first visual road sign; and
adjust the first positioned location information by using the positioned location information of the first visual road sign and the positioning image of the first visual road sign.

16. The positioned location adjustment apparatus according to claim 13, wherein the positioned location adjustment apparatus is further configured to:
collect an image of a current area in which the positioned location adjustment apparatus is located, and determine a relative location between a feature in the image and the positioned location adjustment apparatus;

calculate positioned location information of the feature in the image based on the second positioned location information and the relative location; and send the image and the positioned location information of the feature in the image to an vehicle to everything server, wherein the image and the positioned location information of the feature in the image are used by the vehicle to everything server to generate road sign information of a second visual road sign, and add the road sign information of the second visual road sign to a visual road sign feature library; and the second visual road sign is the feature in the image.

17. The positioned location adjustment apparatus according to claim 13, wherein the positioned location adjustment apparatus is further configured to:

when a positioning error value of the positioned location adjustment apparatus exceeds a first threshold, send a second request message to an vehicle to everything server, wherein the second request message comprises the first positioned location information, the second request message is used to request the vehicle to everything server to search for road sign information of a third visual road sign that matches the first positioned location information, and the third visual road sign is a visual road sign that matches the first positioned location information and that is stored in a visual road sign feature library;

receive a second response message from the vehicle to everything server; and if the second response message does not comprise the road sign information of the third visual road sign, send the first request message to the plurality of reference vehicles.

18. The positioned location adjustment apparatus according to claim 13, wherein the positioned location adjustment apparatus is further configured to:

when a positioning error value of the positioned location adjustment apparatus exceeds a first threshold, send a second request message to an vehicle to everything server, wherein the second request message comprises the first positioned location information, the second request message is used to request the vehicle to everything server to search for road sign information of a third visual road sign that matches the first positioned location information, the road sign information of the third visual road sign comprises a positioning image of the third visual road sign, positioned location information of the third visual road sign, and a road sign attribute of the third visual road sign, and the road sign attribute is a fixed location or reported by a vehicle;

receive a second response message from the vehicle to everything server;

if the second response message comprises road sign information of a plurality of third visual road signs, determine whether there is a third visual road sign whose road sign attribute is the fixed location in the plurality of third visual road signs; and if there is the third visual road sign whose road sign attribute is the fixed position, adjust the first positioned location information based on the positioning image of the third visual road sign and the positioned location information of the third visual road sign, to obtain the second positioned location information.

19. The positioned location adjustment apparatus according to claim 18, wherein the road sign information of the third visual road sign further comprises a positioning error value of the third visual road sign; and the positioned location adjustment apparatus is further configured to:

if there is no third visual road sign whose road sign attribute is the fixed position, select a third visual road sign with a minimum positioning error value from the plurality of third visual road signs based on the positioning error value of the third visual road sign, and determine the third visual road sign as a target third visual road sign; and adjust the first positioned location information based on a positioning image of the target third visual road sign and positioned location information of the target third visual road sign, to obtain the second positioned location information.

20. The positioned location adjustment apparatus according to claim 13, wherein the positioned location adjustment apparatus is further configured to:

if the positioned location adjustment apparatus does not receive the first response message, send a third request message to vehicle to everything server, wherein the third request message is used to request the vehicle to everything server to search for a reference vehicle that meets a preset condition, and the preset condition is that: a positioning error value is less than a first threshold and is within a preset range of the positioned location adjustment apparatus;

receive a third response message from the vehicle to everything server; and if the third response message does not comprise vehicle information of the reference vehicle, restrict when a positioning error value of the positioned location adjustment apparatus exceeds a second threshold, the positioned location adjustment apparatus from using visual positioning, wherein the vehicle information of the reference vehicle comprises positioned location information of the reference vehicle, a positioning error value of the reference vehicle, and vehicle identifier information of the reference vehicle; or if the third response message comprises vehicle information of a plurality of reference vehicles, determine a third vehicle from the plurality of reference vehicles based on the positioning error value of the reference vehicle, and adjust the first positioned location information based on positioned location information of the third vehicle and vehicle identifier information of the third vehicle, to obtain the second positioned location information.

* * * * *